US009544257B2

(12) United States Patent
Ogundokun et al.

(10) Patent No.: US 9,544,257 B2
(45) Date of Patent: Jan. 10, 2017

(54) SYSTEM AND METHOD FOR CONDUCTING PRIVATE MESSAGING

(71) Applicant: BlackBerry Limited, Waterloo (CA)

(72) Inventors: Remi Wesley Ogundokun, Ottawa (CA); Sean Hungerford, Kitchener (CA); Jessica Lo, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 86 days.

(21) Appl. No.: 14/245,392

(22) Filed: Apr. 4, 2014

(65) Prior Publication Data

US 2015/0288633 A1 Oct. 8, 2015

(51) Int. Cl.
G06F 15/16 (2006.01)
H04L 12/58 (2006.01)
H04L 12/18 (2006.01)

(52) U.S. Cl.
CPC .......... H04L 51/12 (2013.01); H04L 12/1818 (2013.01); H04L 12/1822 (2013.01); H04L 12/1827 (2013.01); H04L 51/04 (2013.01); H04L 51/22 (2013.01); H04L 51/32 (2013.01)

(58) Field of Classification Search
CPC .......... H04L 12/1818; H04L 12/18212; H04L 51/04; H04L 51/32
USPC ........................................ 709/206
See application file for complete search history.

(56) References Cited

U.S. PATENT DOCUMENTS

| | | | | |
|---|---|---|---|---|
| 2003/0018971 A1* | 1/2003 | McKenna, Jr. | ...... | H04N 21/462 725/40 |
| 2004/0030750 A1* | 2/2004 | Moore | ...... | G10L 15/265 709/204 |
| 2006/0026233 A1* | 2/2006 | Tenembaum | ...... | A63F 13/12 709/205 |
| 2007/0124212 A1* | 5/2007 | Storch | ...... | G06Q 20/102 705/27.1 |
| 2007/0288560 A1* | 12/2007 | Bou-Ghannam | ...... | G06Q 10/107 709/204 |
| 2008/0034040 A1* | 2/2008 | Wherry | ...... | G06Q 10/107 709/204 |
| 2010/0205541 A1* | 8/2010 | Rapaport | ...... | G06Q 10/10 715/753 |
| 2011/0027762 A1* | 2/2011 | Keim | ...... | G09B 19/06 434/157 |
| 2011/0166904 A1* | 7/2011 | Arrowood | ...... | G06Q 10/06313 705/7.23 |
| 2011/0167026 A1* | 7/2011 | Baker | ...... | G09B 19/18 706/12 |
| 2012/0290950 A1* | 11/2012 | Rapaport | ...... | H04L 51/32 715/753 |

(Continued)

Primary Examiner — Richard G Keehn
(74) Attorney, Agent, or Firm — Jeffrey N. Giunta; Fleit Gibbons Gutman Bongini & Bianco P.L.

(57) ABSTRACT

A system method are provided for enabling private messaging. The method comprises displaying a first messaging user interface with at least one contact, the first messaging user interface comprising at least one element identifying messaging participants; detecting a first input at the first messaging user interface, to enter a private conversation with the at least one contact; and displaying a second messaging user interface, the second messaging user interface modifying the at least one element to conceal an identity of at least one messaging participant in the second messaging user interface.

19 Claims, 23 Drawing Sheets

(56) References Cited

U.S. PATENT DOCUMENTS

2013/0110946 A1* 5/2013 Bradshaw .............. G06Q 50/01
                                                    709/206
2014/0137193 A1* 5/2014 Inoue ................... H04L 63/104
                                                    726/3
2015/0188928 A1* 7/2015 Shapiro .................. H04L 51/16
                                                    709/206

* cited by examiner

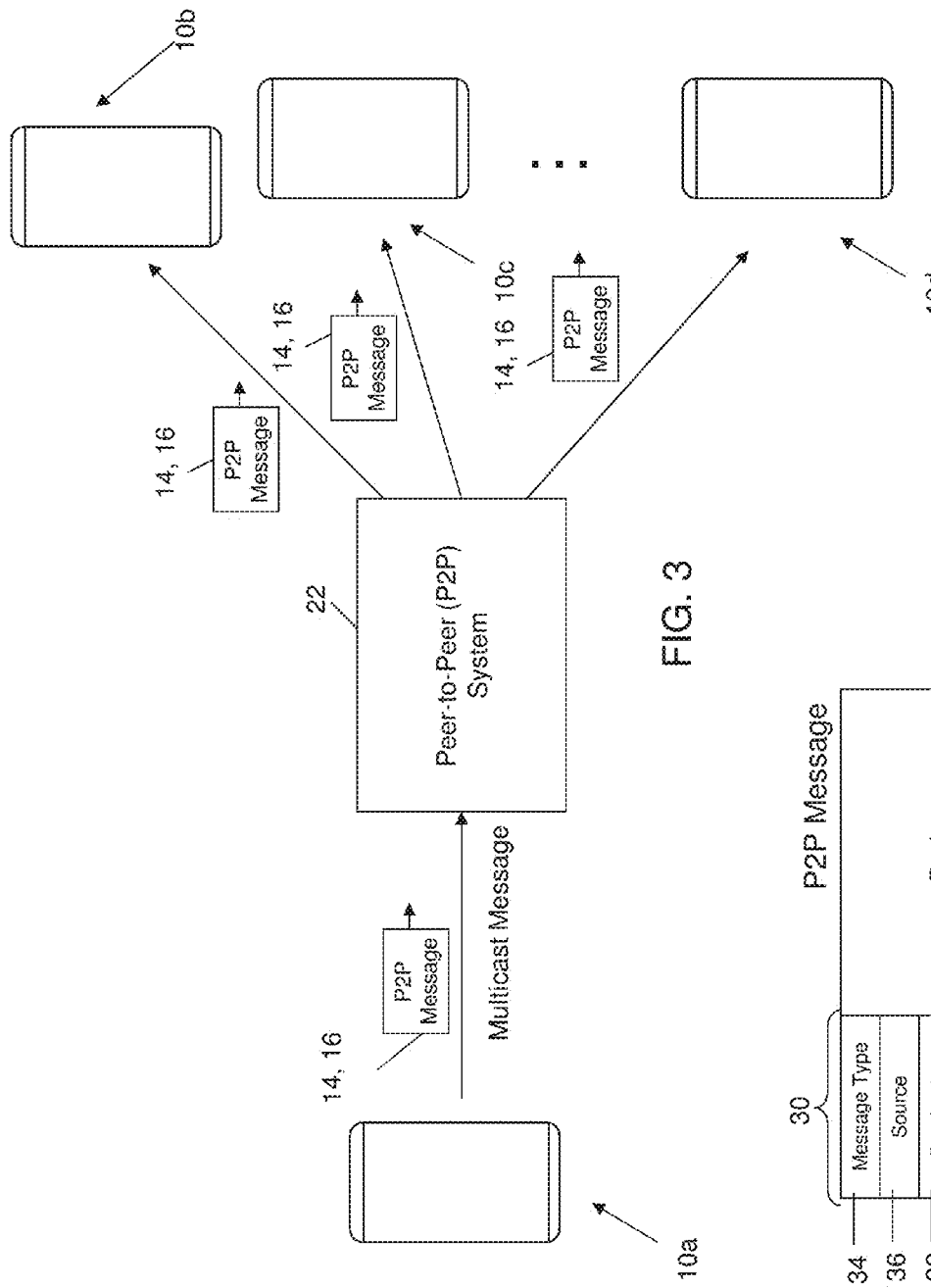
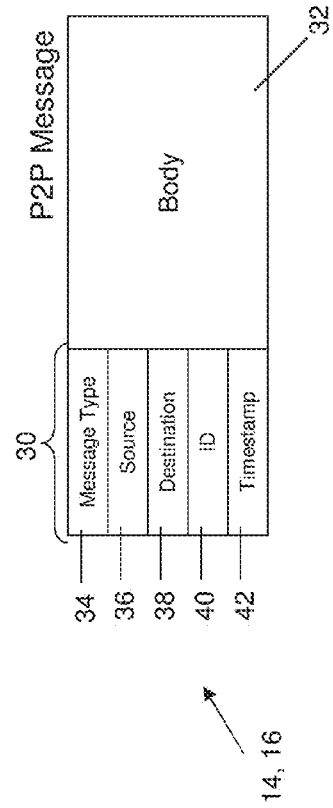
FIG. 3
FIG. 4

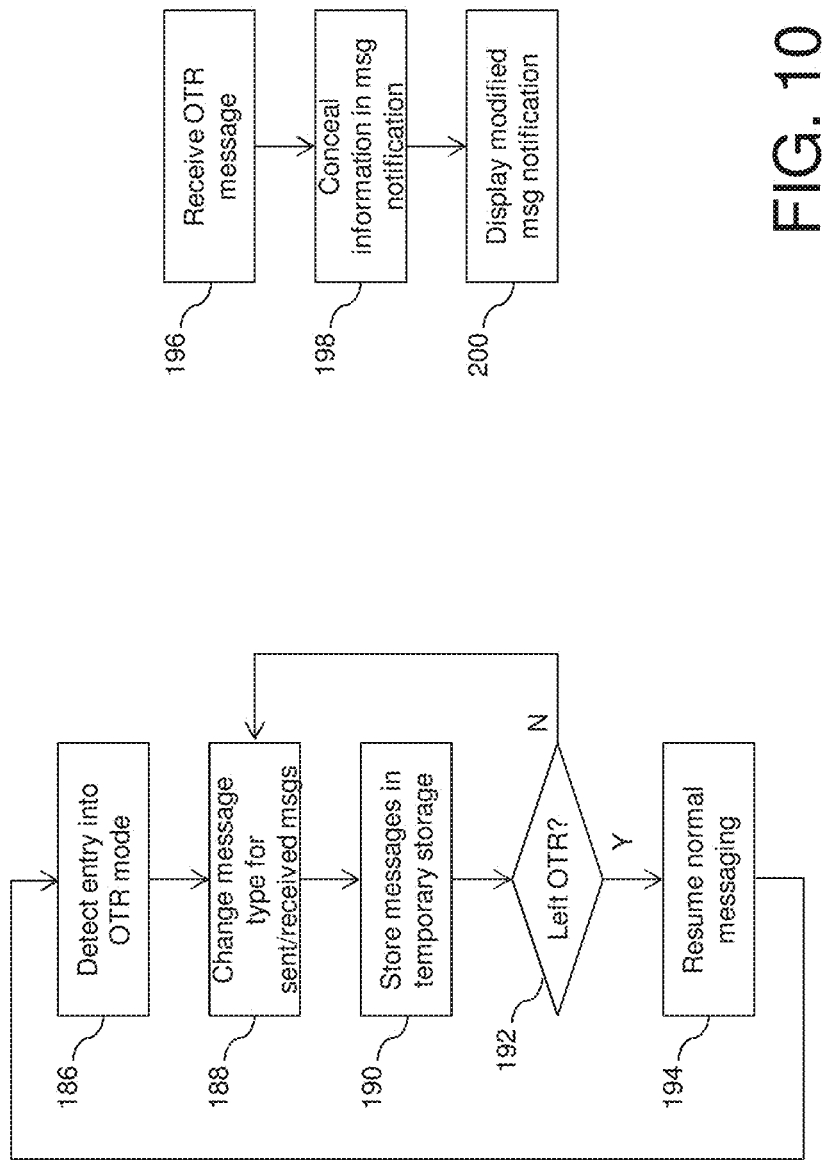

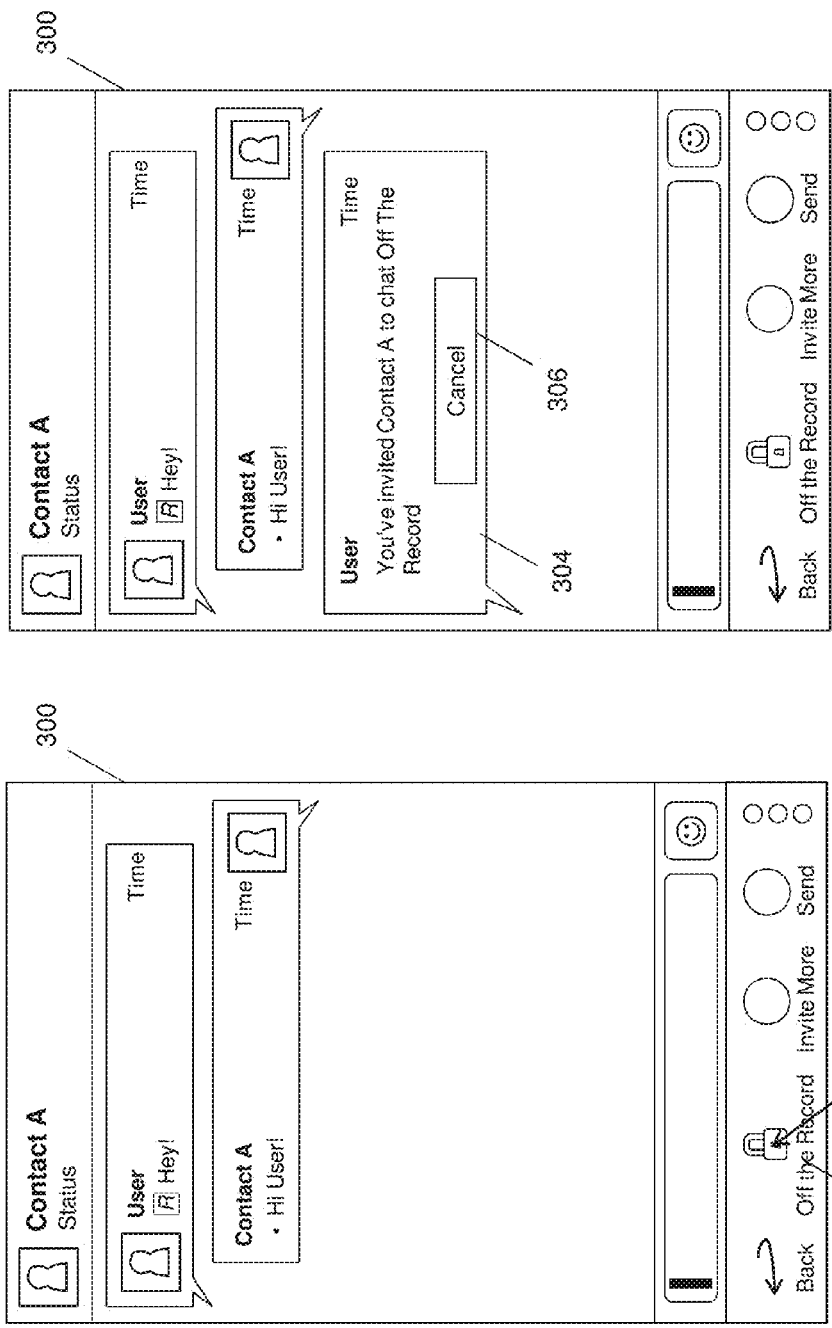

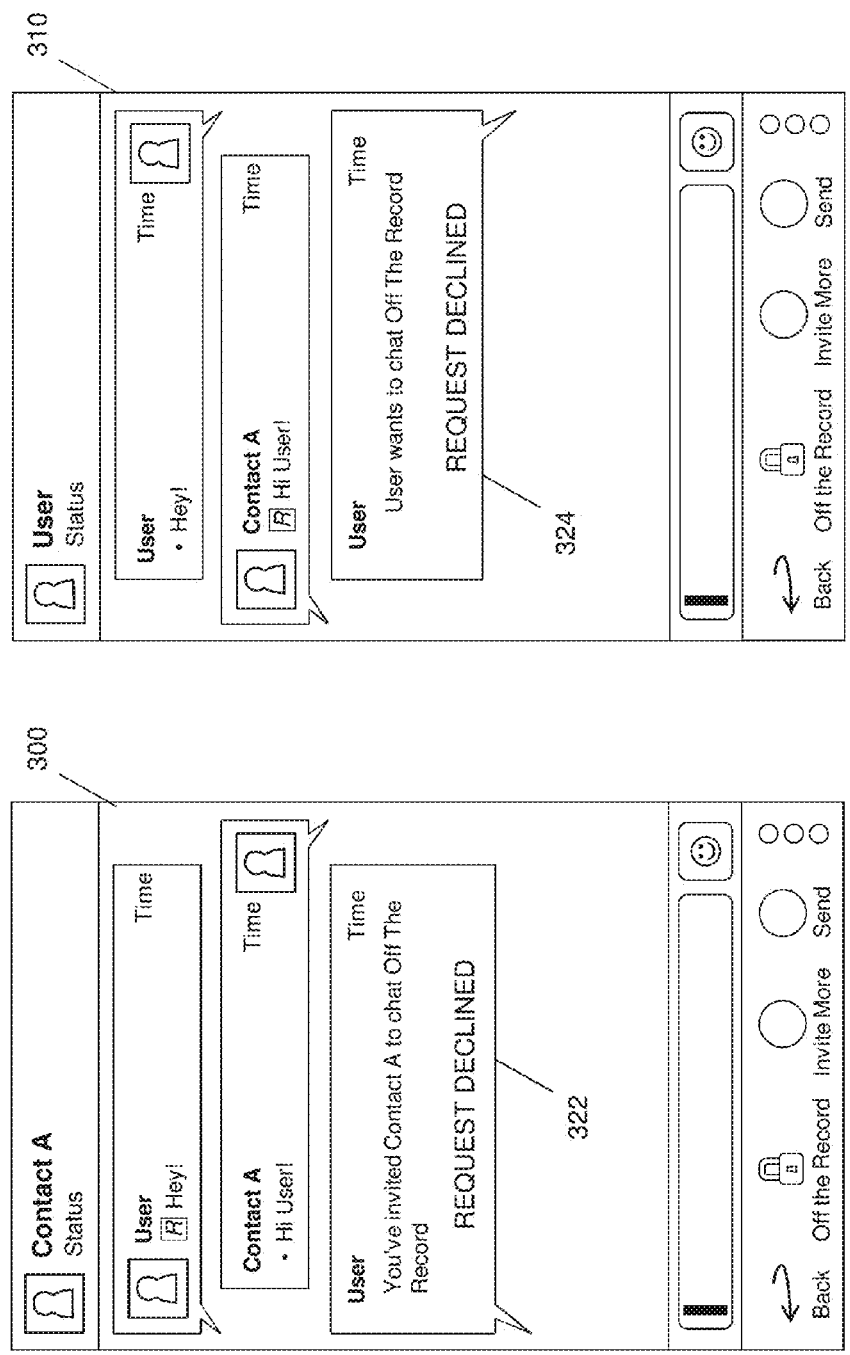

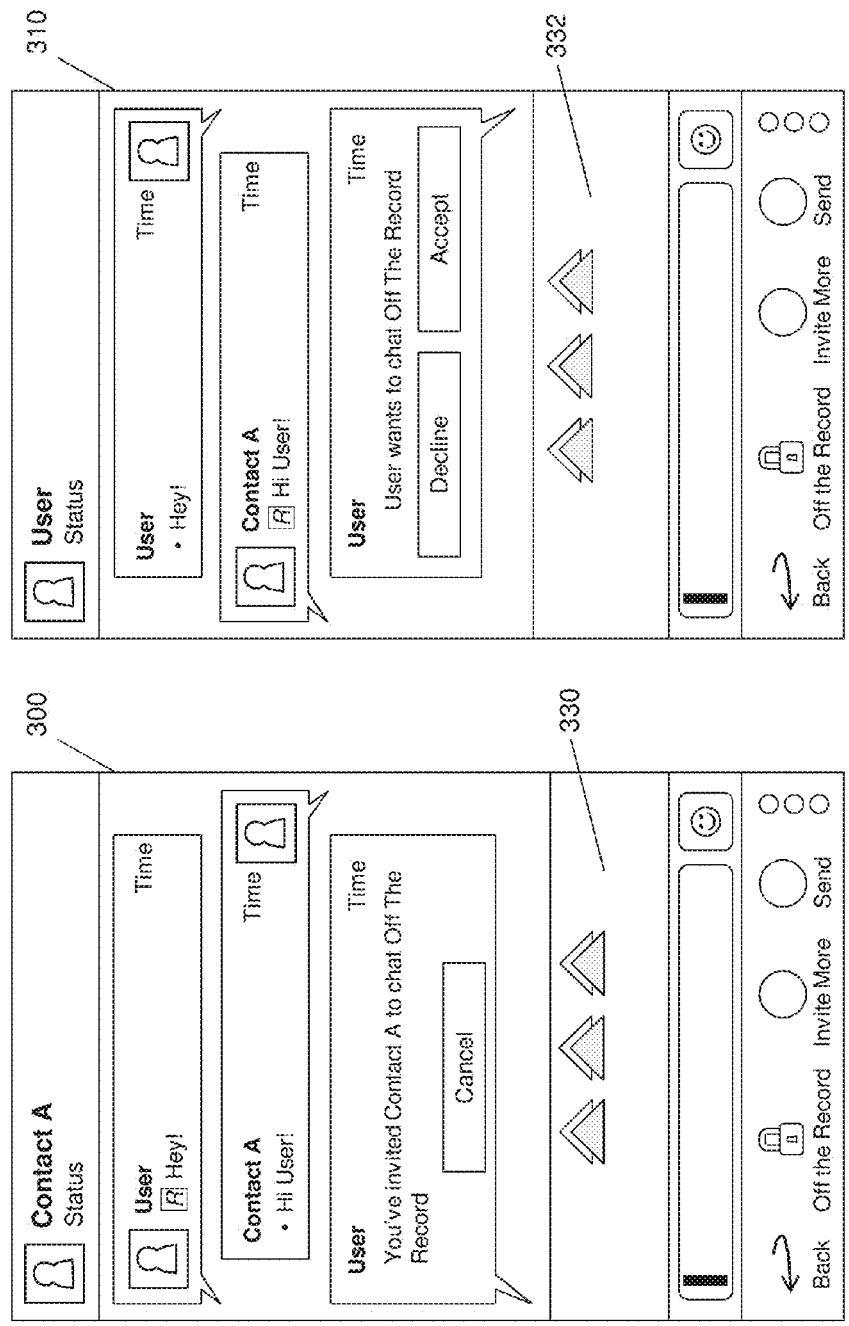

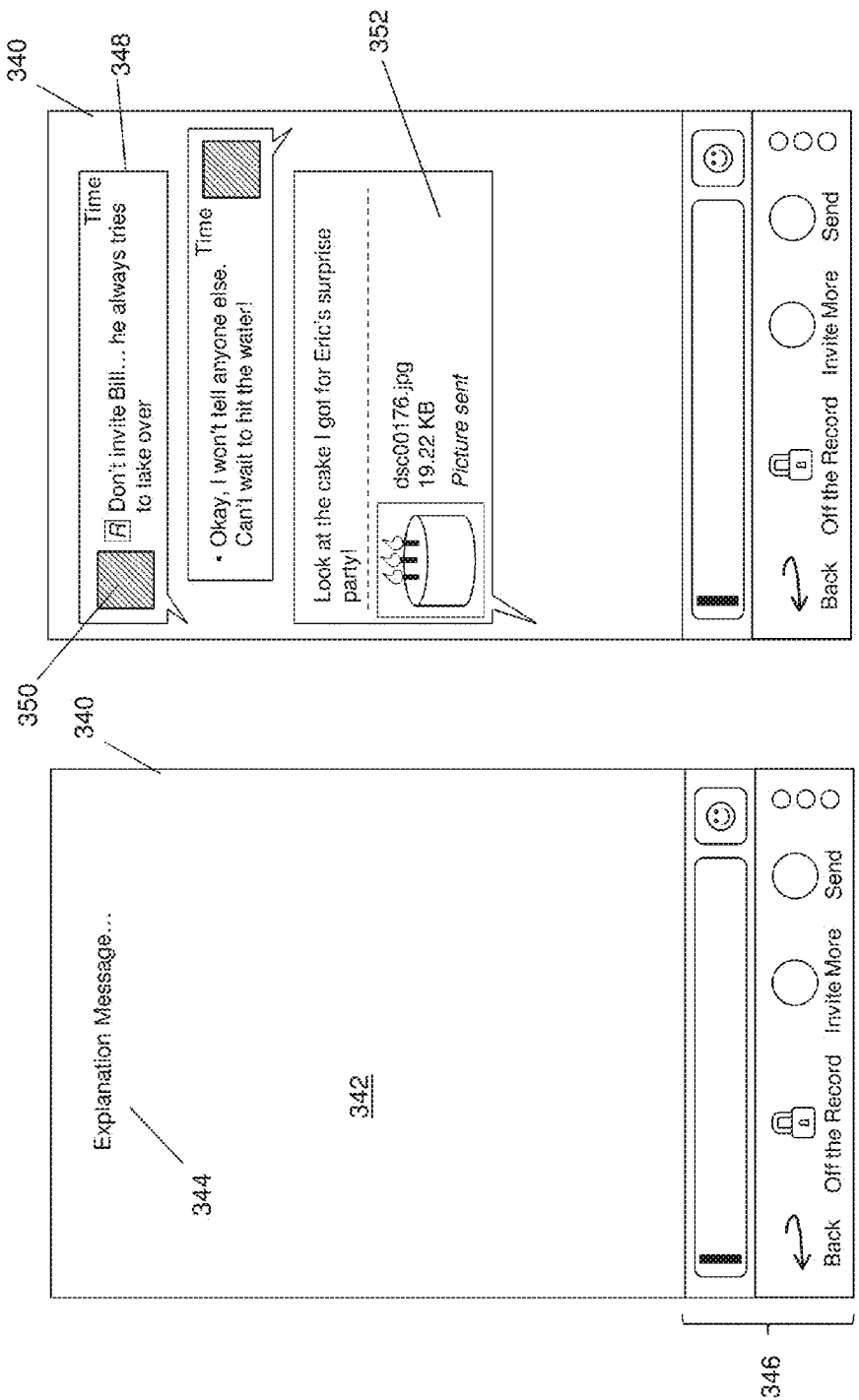

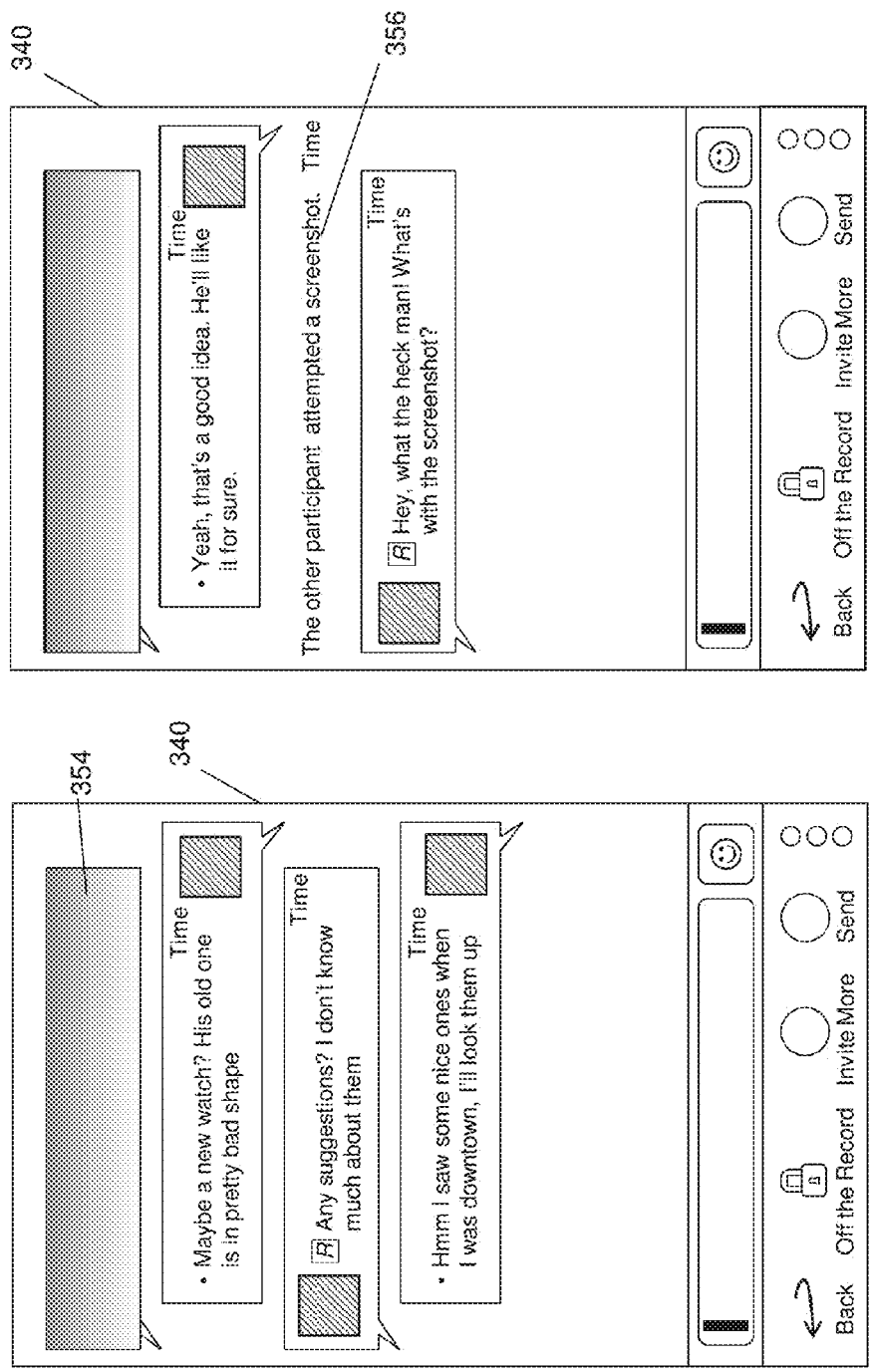

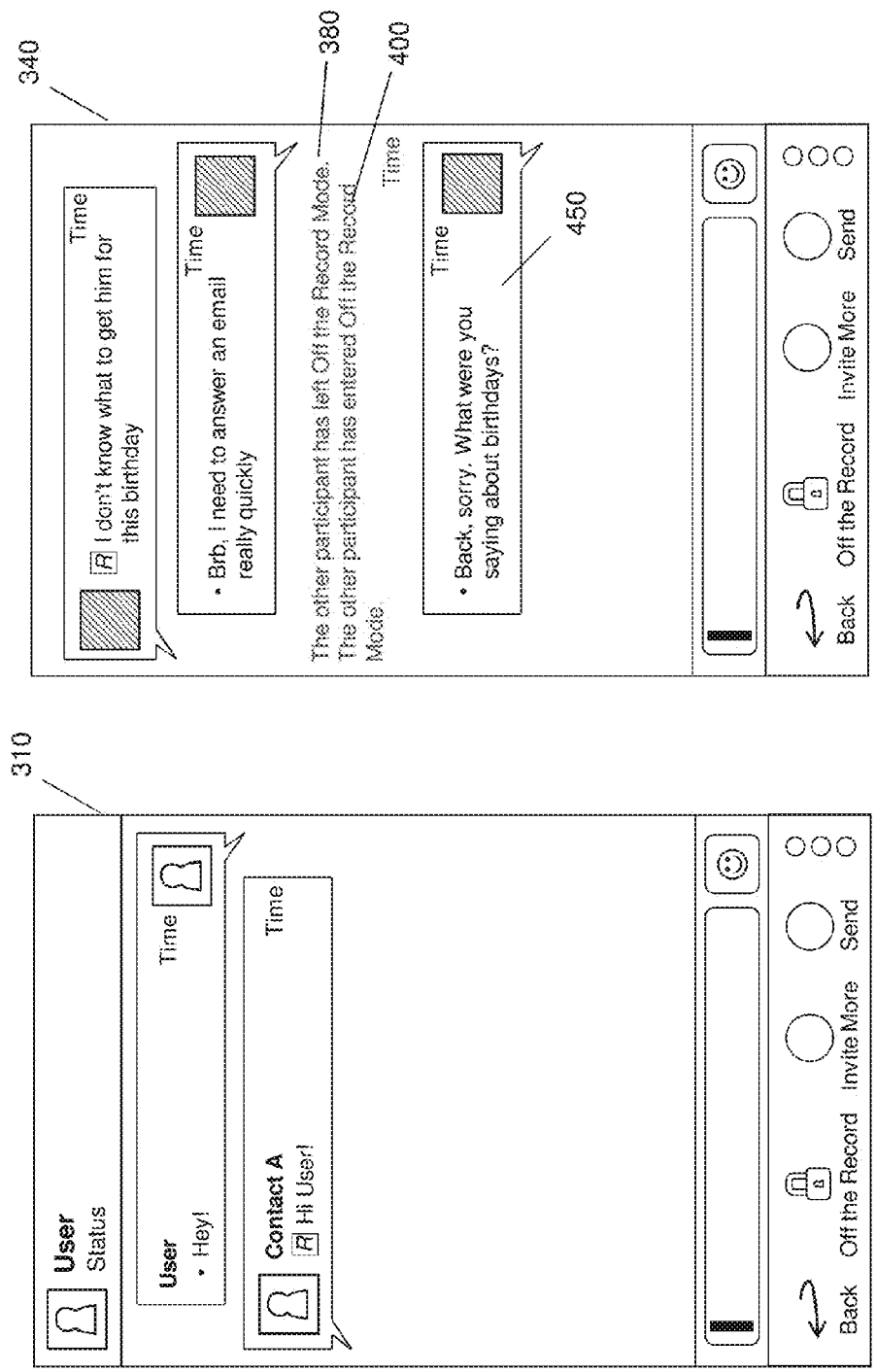

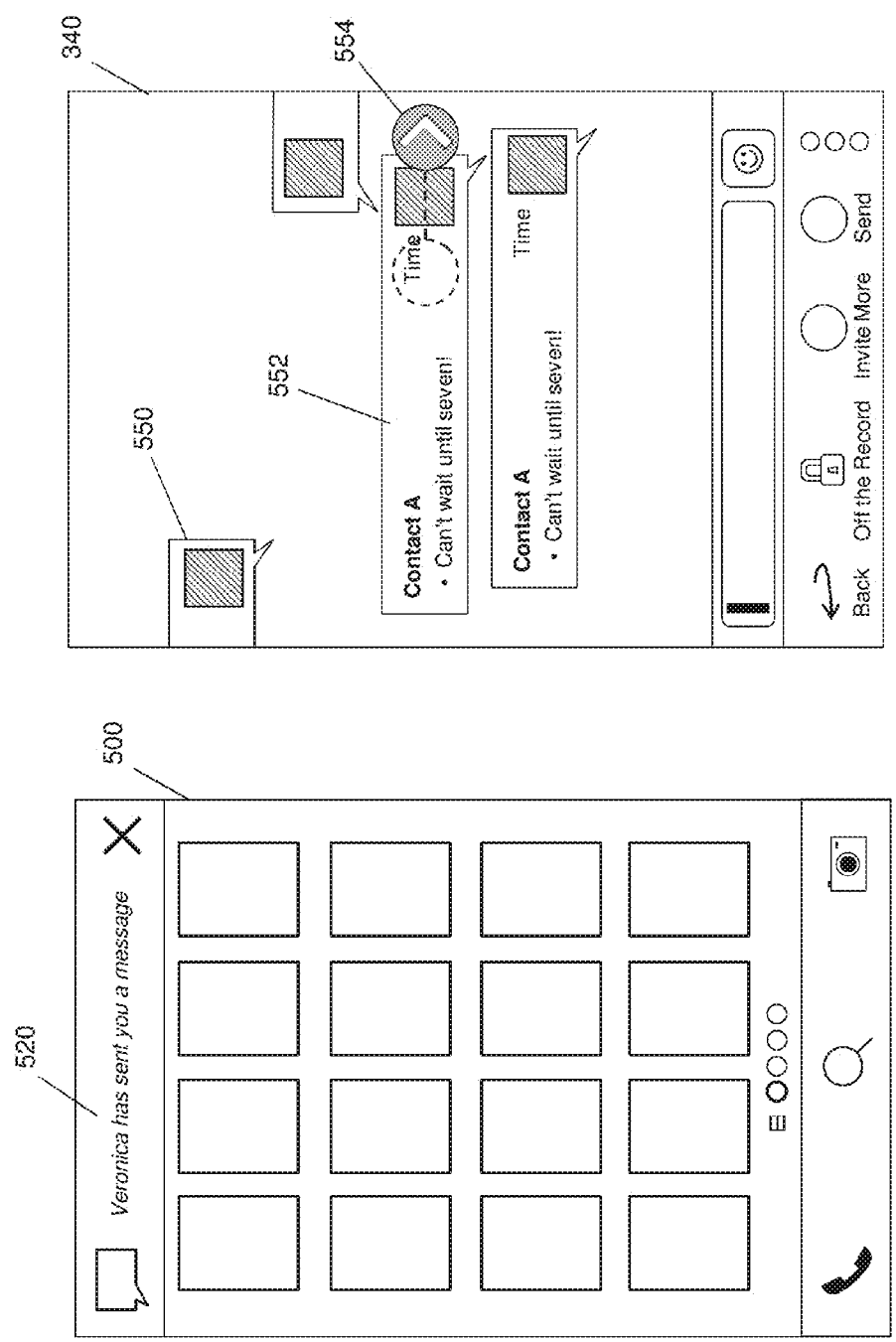

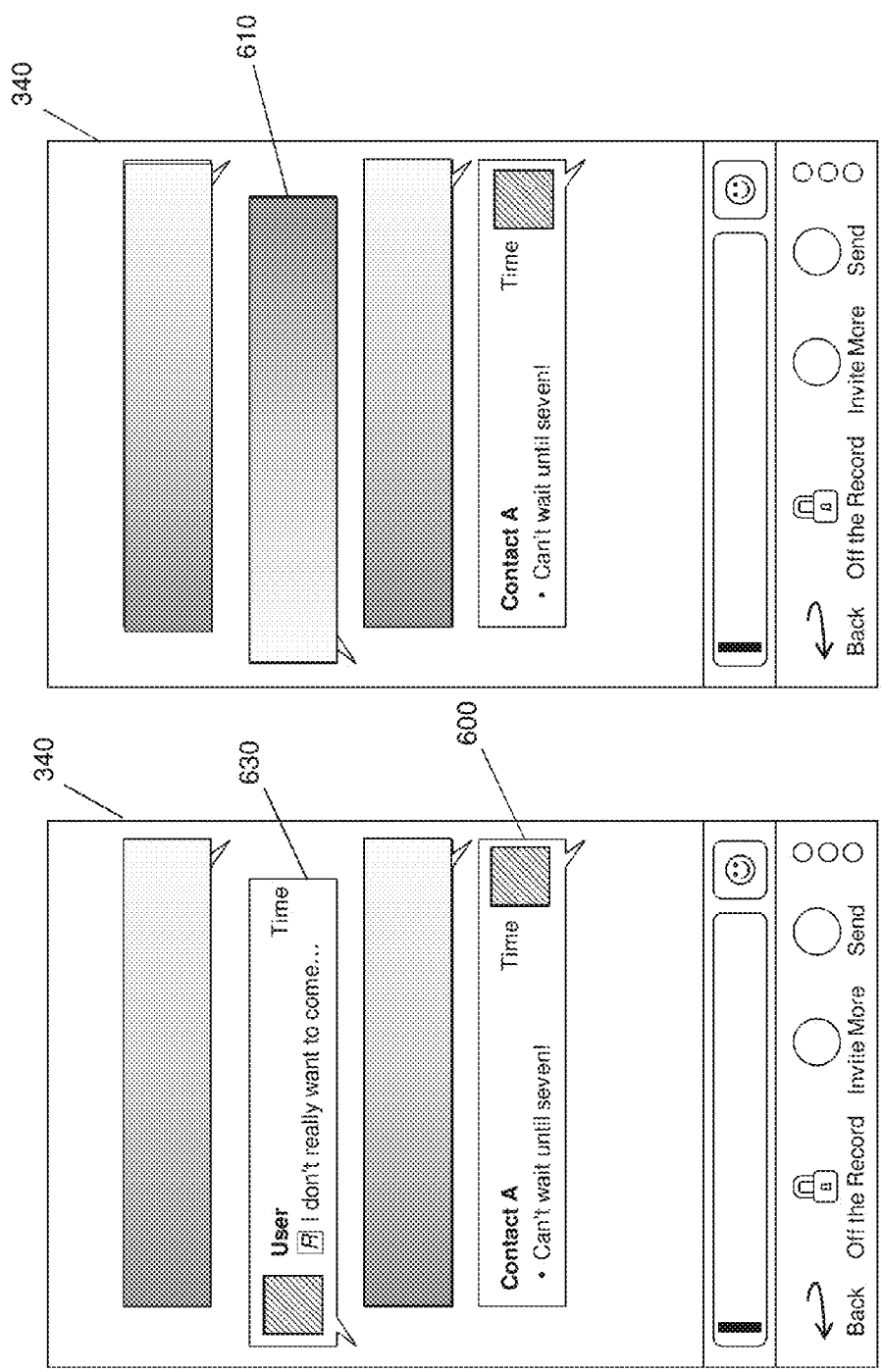

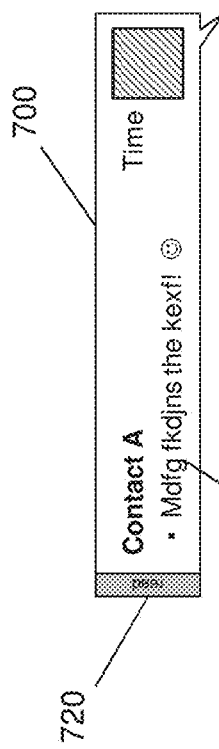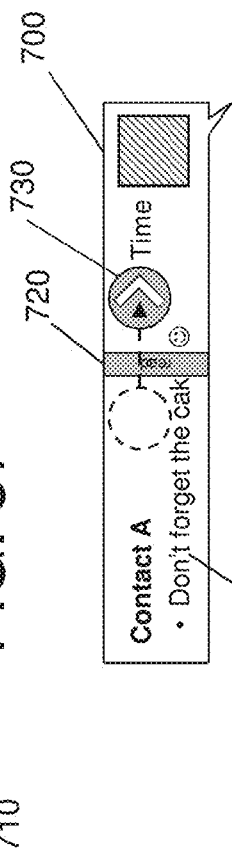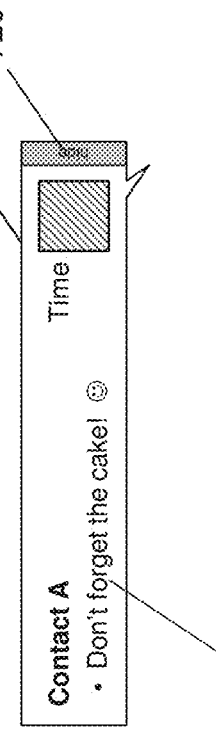

SYSTEM AND METHOD FOR CONDUCTING PRIVATE MESSAGING

TECHNICAL FIELD

The following relates to systems and methods for conducting private messaging.

DESCRIPTION OF THE RELATED ART

Electronic messaging such as email, instant messaging, text messaging and the like has become ubiquitous both in desktop computing environments and mobile environments. While many messaging applications provide some level of security and privacy, the contents of a messaging session are typically visible on a device screen and may be viewed at a later time by another user that comes into possession of the device. Even with device passwords and other security measures in place, there are situations where another user can gain access to the contents of a messaging session and potentially become privy to private or sensitive information.

BRIEF DESCRIPTION OF THE DRAWINGS

Embodiments will now be described by way of example with reference to the appended drawings wherein:

FIG. 3 is a schematic diagram illustrating multi-cast messaging;

FIG. 4 is a block diagram illustrating an example of a peer-to-peer message configuration;

FIG. 9 is a flow chart illustrating computer executable operations that may be performed in processing messages during a private messaging session within a peer-to-peer messaging conversation;

FIG. 10 is a flow chart illustrating computer executable operations that may be performed in processing notifications for private messages;

FIG. 11 is a screen shot of an example of a graphical user interface for an instant messaging conversation;

FIG. 12 is a screen shot of an example of a graphical user interface for an instant messaging conversation displaying a notification that a private messaging invitation has been sent;

FIGS. 17 and 18 are screen shots of example of graphical user interfaces for an instant messaging conversation displaying an declined invitation request notification for the requestor and recipient respectively;

FIGS. 19 and 20 are screen shots of example of graphical user interfaces for an instant messaging conversation displaying a mechanism to enter a private messaging session within the existing instant messaging conversation for the requestor and recipient respectively;

FIG. 21 is a screen shot of an example of a graphical user interface for a modified instant messaging conversation for a private messaging session within the existing instant messaging conversation;

FIG. 22 is a screen shot of an example of a private messaging user interface within an existing instant messaging conversation;

FIG. 23 is a screen shot illustrating a fading message within a private messaging user interface;

FIG. 24 is a screen shot illustrating a screen capture attempt notification during a private messaging session;

FIG. 29 is a screen shot of an example of an instant messaging conversation user interface returned to subsequent to a private messaging session within the conversation;

FIG. 30 is a screen shot of an example of a private messaging user interface displaying notifications that the other participant has left and returned to the private messaging session;

FIG. 31 is screen shot of a home screen for a mobile device displaying an incoming instant message notification associated with a private message;

FIGS. 32 to 39 are screen shots of a private messaging user interface illustrating example techniques for concealing prior messages.

DETAILED DESCRIPTION

Figure 1:
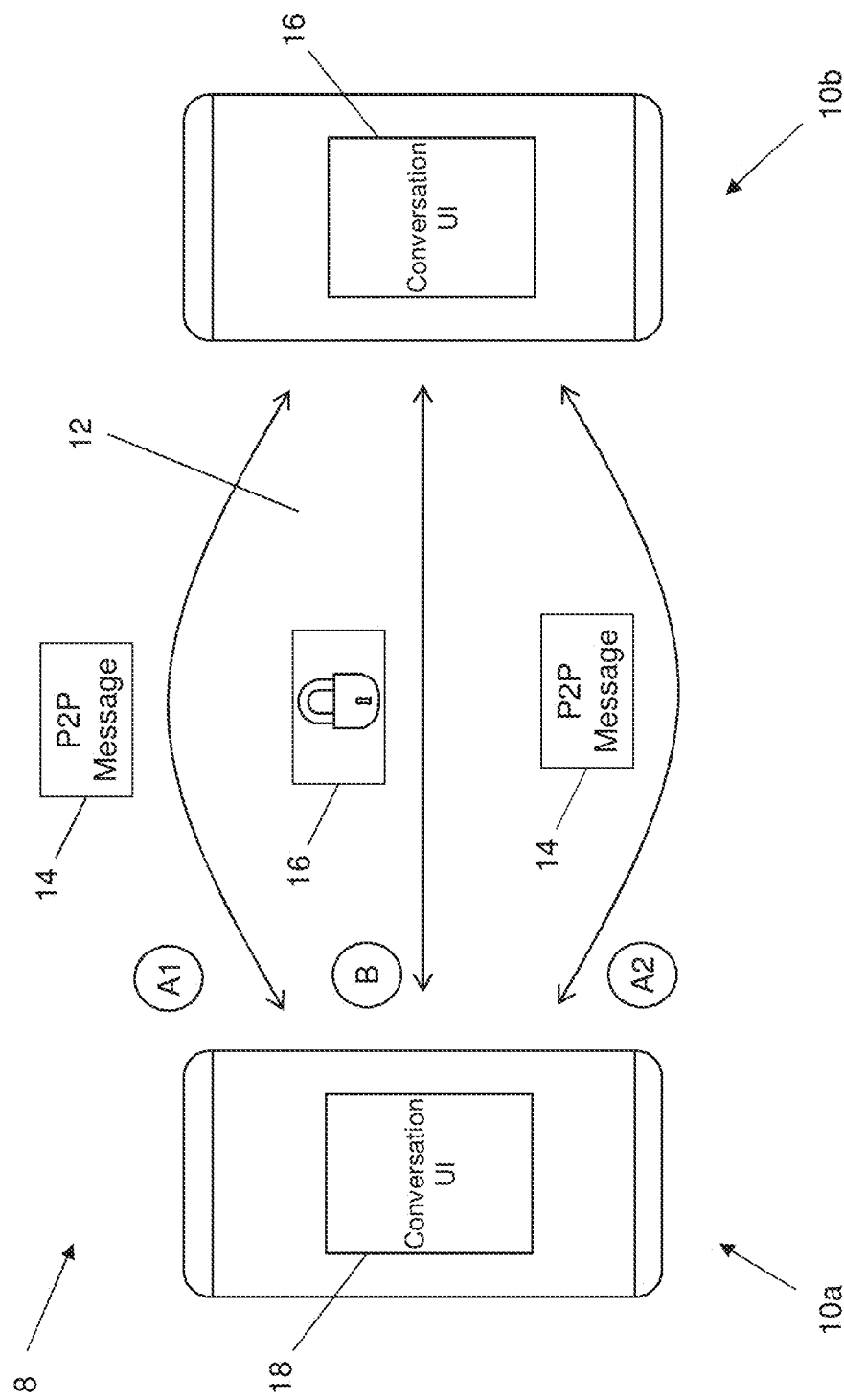
FIG. 1 is a schematic diagram illustrating messaging between mobile devices.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

To address potential privacy and security issues concerning the display of messaging content, and to provide a more convenient way to switch between sensitive and non-sensitive messaging, it has been found that a messaging interface such as that used in instant messaging can be transitioned into and out of a private, secure, or "off the record" (OTR) mode. Such an OTR mode enables messages to be temporarily handled as private messages with the private messages removed or otherwise not stored within the normal or existing messaging conversation after the user leaves the OTR mode. Messages displayed during the OTR mode can also be concealed or obscured to further enhance the security and privacy of the private messaging session. It has been found that the following principles can apply to any type of messaging content, for example, text, audio, and video messages.

There is provided a method of messaging comprising: displaying a first messaging user interface with at least one contact, the first messaging user interface comprising at least one element identifying messaging participants; detecting a first input at the first messaging user interface, to enter a private conversation with the at least one contact; and displaying a second messaging user interface, the second messaging user interface modifying the at least one element to conceal an identity of at least one messaging participant in the second messaging user interface.

There is also provided a computer readable storage medium comprising computer executable instructions for messaging, the computer executable instructions comprising instructions for: displaying a first messaging user interface with at least one contact, the first messaging user interface comprising at least one element identifying messaging participants; detecting a first input at the first messaging user interface, to enter a private conversation with the at least one contact; and displaying a second messaging user interface, the second messaging user interface modifying the at least one element to conceal an identity of at least one messaging participant in the second messaging user interface.

There is also provided an electronic device comprising a processor, a display, and memory, the memory comprising computer executable instructions for causing the processor to enable messaging on the electronic device, the computer executable instructions comprising instructions for: displaying a first messaging user interface with at least one contact, the first messaging user interface comprising at least one element identifying messaging participants; detecting a first input at the first messaging user interface, to enter a private conversation with the at least one contact; and displaying a second messaging user interface, the second messaging user interface modifying the at least one element to conceal an identity of at least one messaging participant in the second messaging user interface.

Turning now to FIG. 1 an example of a communication system 8 is shown which facilitates messaging between a first mobile device 10a and a second mobile device 10b (also referred to generally as "mobile device 10" hereinafter) over a communication channel 12. In the example shown in FIG. 1, the communication channel 12 facilitates peer-to-peer (P2P) messaging, e.g., instant messaging, which includes the exchange of P2P messages 14. The mobile devices 10a, 10b are operable to display a conversation user interface (UI) 18 for conducting a P2P conversation. The conversation UI 18 provides for both typical, normal, or otherwise "regular" messaging using regular P2P messages 14, and private or secure messaging using private P2P messages 16, to enable a user to enter and leave private sessions with a contact or group of contacts (e.g., within a private group chat), within the same UI that is used for normal or regular P2P messaging. For example, as shown in FIG. 1, messaging may be conducted in sub-session A1 using regular P2P messages 14, with the conversation switching to a private sub-session B which uses private P2P messages 16, and switching back to regular messaging in sub-session A2 using the same conversation UI 18. In this way, the advantages of private messaging can be seamlessly incorporated into a familiar and existing messaging environment with the contact for which the private sub-session is desired. For example, during a conversation, one correspondent may wish to have a brief private chat regarding a sensitive topic and not wish to have those messages persisted, particularly within the existing conversation. At the same time, the correspondents can switch to the private mode without having to create and then delete or destroy another conversation and/or utilize another service or application in order to have a "side conversation".

In the following examples, a private or concealed sub-session or temporary portion of a conversation may also be referred to as an "off-the-record (OTR)" chat or OTR mode for illustrative purposes. It has been found that such an OTR mode is particularly advantageous within P2P-type messaging environments such those utilizing IM UIs since ongoing conversations with contacts can persist indefinitely. The ability to seamlessly navigate into and out of the OTR mode to conduct temporary private sub-chats avoids the need to create additional conversations or utilize alternative services or applications in order to do so, without disrupting the "regular" conversation portions. While the example shown in FIG. 1 illustrates messaging between a pair of correspondents, the principles described herein may also be applied to group chats having three or more messaging participants.

Figure 2:
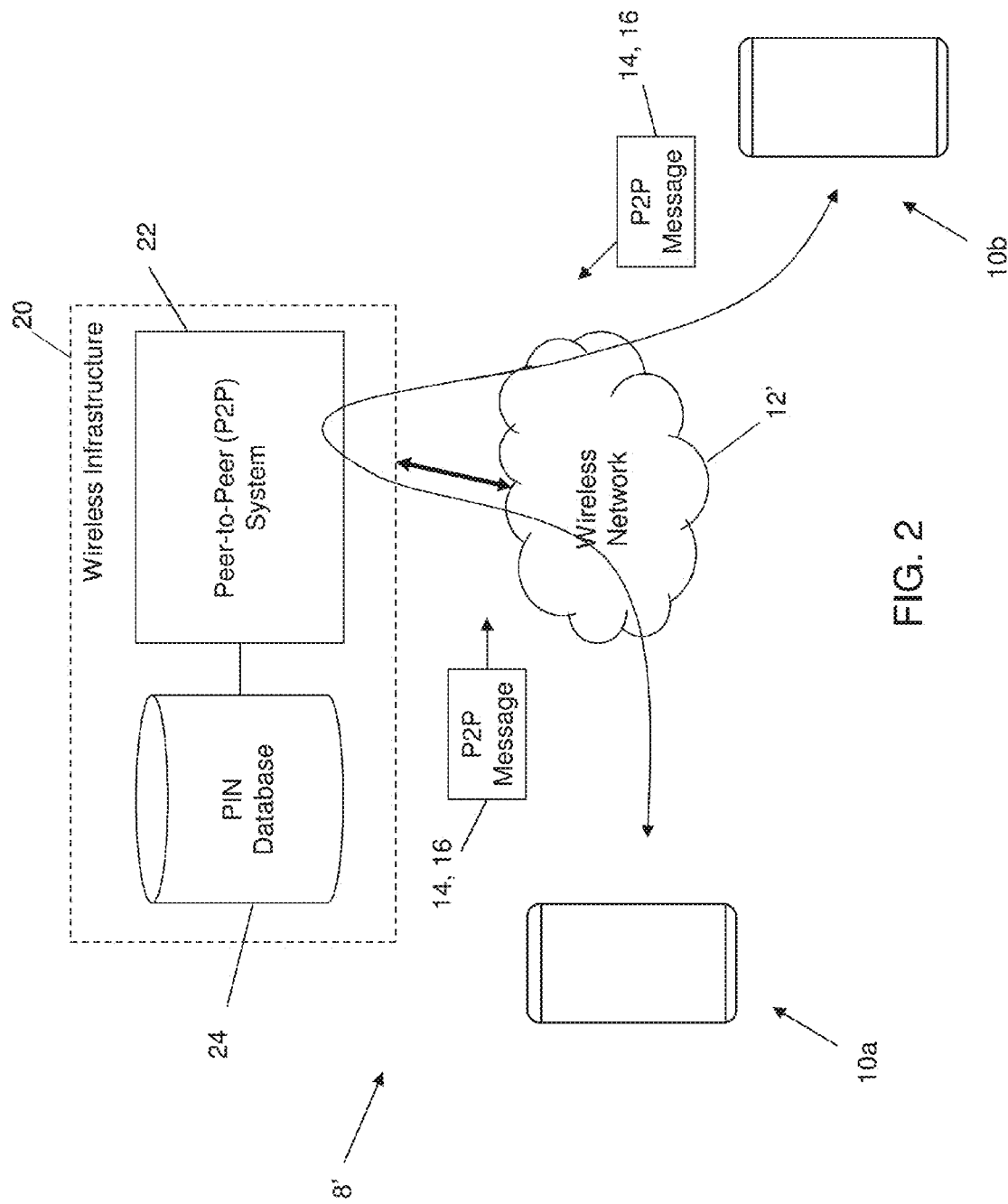
FIG. 2 is a schematic diagram illustrating an example of a peer-to-peer messaging environment.

For illustrative purposes, an example of a communication system 8' including a wireless infrastructure 20 that enables mobile devices 10a, 10b to communicate via a P2P messaging system 22 over a wireless network 12', is shown in FIG. 2. It will be appreciated that the mobile devices 10a, 10b shown in FIG. 2 are shown as such for illustrative purposes and many other mobile devices 10 (not shown) may also be capable of communicating with or within the communication system 8'. It will also be appreciated that although the examples shown herein are directed to mobile communication devices, the same principles may apply to other devices capable of communicating with the P2P system 22. For example, an application (not shown) hosted by a desktop computer or other "non-portable" or "non-mobile" device may also be capable of communicating with other devices (e.g. including mobile devices 10) using the P2P system 22.

The P2P system 22 is, in this example, a component of the wireless infrastructure 20 associated with the wireless network 12'. The wireless infrastructure 20 in this example includes, in addition to the P2P system 22, and among other things not shown for simplicity, a personal identification number (PIN) database 24. The PIN database 24 in this example embodiment is used to store one or more PINs associated with respective mobile devices 10, whether they are subscribers to a service provided by the wireless infrastructure 20 or otherwise.

A first mobile device 10a may communicate with a second mobile device 10b and vice versa via the P2P system 22, in order to perform P2P messaging or to otherwise exchange P2P-based communications. For ease of explanation, in the following examples, any P2P-based communication may also be referred to as a P2P message 14, 16 as shown in FIG. 2. It can be appreciated that only two mobile devices 10a, 10b are shown in FIG. 2 for ease of illustration and, for example, in an electronic group conversation, three or more mobile devices 10 would be participating in the group conversation. The P2P system 22 in the example shown is configured to facilitate communication of both regular P2P messages 14 and private or OTR P2P messages 16. For example, the P2P system 22 can identify from information included in the messages 14, 16 whether the message is a regular P2P message 14 or an OTR P2P message 16 for the purpose of determining whether to store a copy of the message 14, 16 and for how long. The P2P system 22 may be configured to only cache OTR P2P messages 16 for a period of time, or the mobile devices 10a, 10b may be responsible for temporarily storing OTR P2P messages 16 for the during of a private OTR session.

In some example embodiments, the P2P system 22 may be capable of sending multi-cast messages, i.e. forwarding a single message from a sender to multiple recipients without requiring multiple P2P messages 64 to be generated by such a sender. For example, as shown in FIG. 3, the P2P system 22 can be operable to enable a single P2P message 14, 16 to be sent to multiple recipients by addressing the P2P message 14, 16 to multiple corresponding P2P addresses, and having the P2P system 22 multicast the message 14, 16 to those recipients. It can be appreciated that multi-cast messages would not be permitted in an OTR mode unless all recipients are included in the private OTR sub-chat. In such a scenario, the procedures described herein for having participants opt into the OTR mode may be applied to all group chat members that are to participate in the discussion.

An example of a P2P message 14, 16 is shown in greater detail in FIG. 4, and has a format that is particularly suitable for a PIN-to-PIN based system. In a typical P2P protocol, each P2P message 14, 16 has associated therewith a source corresponding to the mobile device 10 which has sent the P2P message 14, 16 and includes a destination identifying the one or more intended recipients. Each P2P message 14, 16 in this example includes a body 32, which contains the content for the P2P message 14, 16 (e.g. text, audio, images, video, or other data), and a header 30, which contains various fields used for transmitting and processing each P2P message 14, 16. In this example, the header 30 includes a message type field 34 to specify the type of transmission (e.g. chat, registration, block, presence, etc.), a source field 36 to specify the device address for the sender, a destination field 38 to specify the device address(es) for the one or more intended recipients, an ID field 40 to identify the corresponding P2P application (e.g., see IM application 50 in FIG. 5) and a timestamp field 42 to indicate the time (and if desired, the date) at which the P2P message 14, 16 was sent by the designated sender. The message type field 34 may be used to designate whether the message 14, 16 is a regular P2P message 14 or an OTR message 16. However, the ID field 40 could also be used with a particular ID type being recognizable as an OTR-type message 16. Another field could also be added to the header 30 to indicate OTR messages 16.

It can be appreciated that in this example, the ID field 40 can be used to specify the application ID to identify a P2P application on the mobile device 10. Where the P2P application relates to, for example, an IM system 22', the message type field 34 can also be used to designate an IM communication, and the ID field 40 would then correspond to a conversation ID, i.e. a conversation thread the message 14, 16 corresponds to (e.g. such that each message 14, 16 is identified by the conversation in which it was sent).

Other information or attributes may be included in the P2P message 14, 16, such as a subject field (not shown) to enable a subject for part or all of a conversation (in an IM example) to be transported with the P2P message 14, 16 (e.g. to create new subjects, modify subjects, notify others of subjects, etc.), or application details field (not shown) to provide application-specific information such as the version and capabilities of the application.

The P2P system 22 can utilize any suitable P2P protocol operated by, for example, a P2P router (not shown), which may be part of the wireless infrastructure 20. It can be appreciated however that a stand-alone P2P configuration (i.e. that does not rely on the wireless infrastructure 20—not shown) may equally apply the principles herein. The P2P system 22 may also enable mobile devices 10 to communicate with desktop computers thus facilitating, for example, communications such as instant messaging (IM) between mobile applications and desktop applications on the desktop computer.

Figure 5:
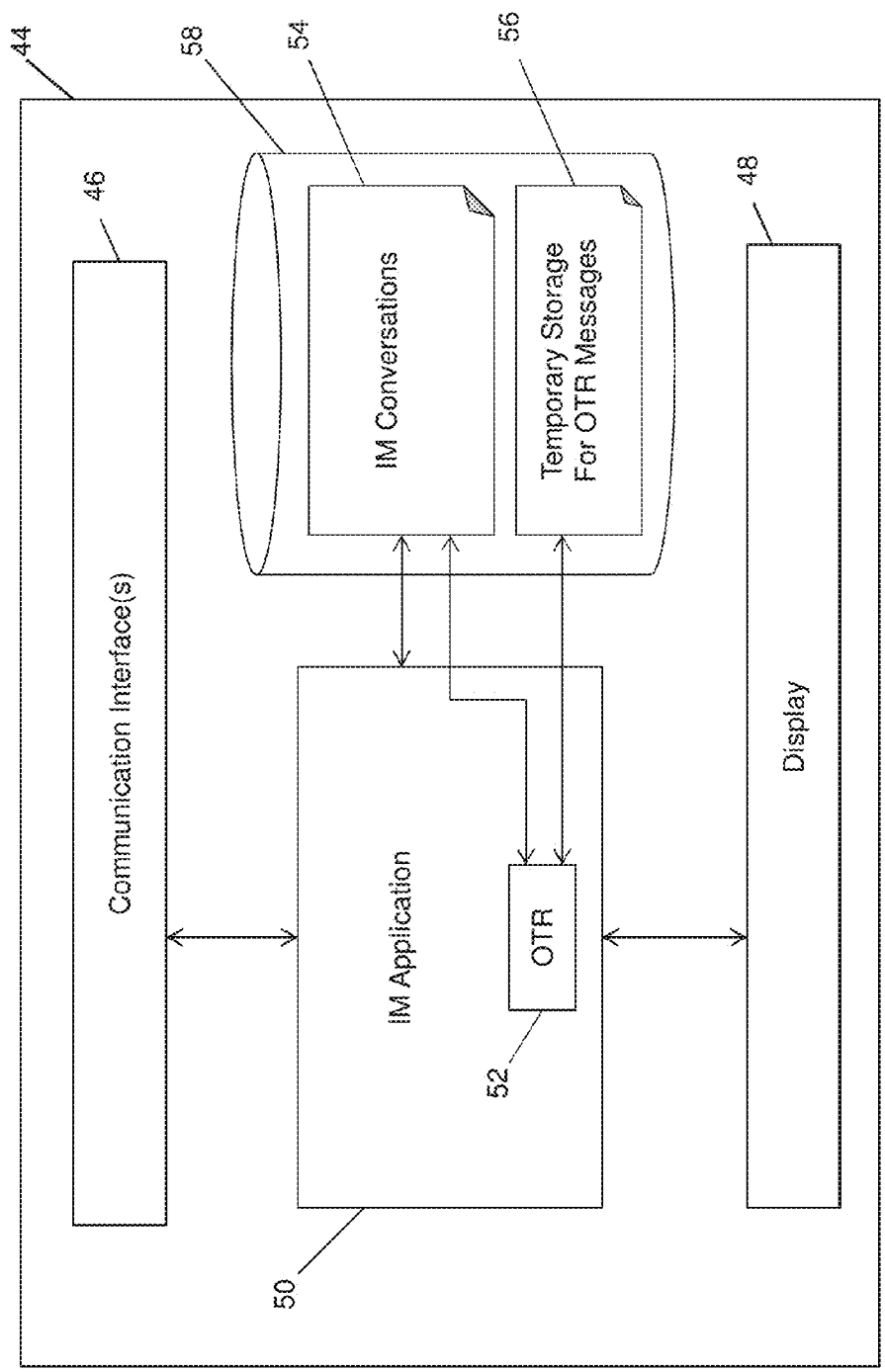
FIG. 5 is a block diagram illustrating an example of a configuration for a mobile device having a peer-to-peer messaging application.

The P2P system 22 can be implemented using a router-based communication infrastructure, such as one that provides email, SMS, voice, Internet and other communications. Particularly suitable for hosting a P2P messaging router, is a wireless router or server used in systems such as those that provide push-based communication services. In FIG. 2, the wireless infrastructure 20 facilitates P2P communications such as instant messaging between mobile devices 10. P2P messaging, such as IMing, is provided by an associated application stored on each mobile device 10, e.g. an IM application 50 as shown in FIG. 5, which can be initiated, for example, by highlighting and selecting an icon from a display as is well known in the art. The P2P system 22 routes messages between the mobile devices 10 according to the P2P protocol being used. For example, the P2P protocol may define a particular way in which to conduct IM or other types of messaging.

In general, in a P2P protocol, the sender of the P2P message 14, 16 knows the source address of the intended recipient, e.g. a PIN. This may be established when the two devices request to add each other to their respective contact or buddy lists. A particular mobile device 10 can communicate directly with various other mobile devices 10 through the P2P system 22 without requiring a dedicated server for facilitating communications. In other words, the P2P system 22 enables the mobile devices 10 to communicate with each other directly over the wireless infrastructure 16' in accordance with the P2P protocol.

When conducting a P2P session according to the example shown in FIG. 2, the mobile devices 10a, 10b can communicate directly with the wireless infrastructure 20 in a client based exchange where, as noted above, an intermediate server is not required. A P2P message 14, 16 sent by one mobile device 10 is received by the wireless infrastructure 20, which obtains the source address for the intended recipient (or recipients) from information associated with the message 14, 16 (e.g. a data log) or from the message 14, 16 itself. After obtaining the recipient's address according to the P2P protocol, the wireless infrastructure 20 then routes the message 14, 16 to the recipient associated with the mobile device 10 having such address (or recipients having respective addresses). The wireless infrastructure 20 typically also provides a delivery confirmation to the original sender, which may or may not be displayed to the user. The destination device can also provide such delivery information. The wireless infrastructure 20 may be capable of routing P2P messages 14, 16 reliably as well as being capable of holding onto the P2P messages 14, 16 until they are successfully delivered. Alternatively, if delivery cannot be made after a certain timeout period, the wireless infrastructure 20 may provide a response indicating a failed delivery. The wireless infrastructure 20 may choose to expire a message 14, 16 if a certain waiting period lapses.

Turning now to FIG. 5, an example of a configuration for a mobile device 10 is shown. The mobile device 10 includes one or more communication interfaces 46 to enable the mobile device 10 to communicate with other devices, services, and domains, e.g. to communicate via the wireless network 12' shown in FIG. 2. The one or more communication interfaces 46 in this example generally represents any one or more short-range, wide-area, wired, or wireless communication connections utilizing a connection/connector/port, wireless radio, etc. The mobile device 10 also includes a display component 48, which may be used by various applications and services on the mobile device 10 including an IM application 50 in the example shown in FIG. 5. The IM application 50 is also configured to utilize the one or more communication interfaces 46 to enable "IMing" on the mobile device 10.

The IM application 50 includes or otherwise has access to an OTR module 52 for enabling participating in OTR sub-chats within IM conversations 54 facilitated by the IM application 50. An IM storage 58 may therefore be included or otherwise accessible to the IM application 50 for storing both IM conversations 54 and to provide a temporary storage allocation 56 for OTR messages 16. The OTR module 52 may represent any programming code, instructions, or component of the IM application 50 that enables an IM conversation 54 for the IM application 50 to navigate into and out of an OTR mode using the same interface with particular contacts. It can be appreciated that the delineation between components shown in FIG. 5 is for illustrative purposes and various other configurations are possible.

Figure 6:
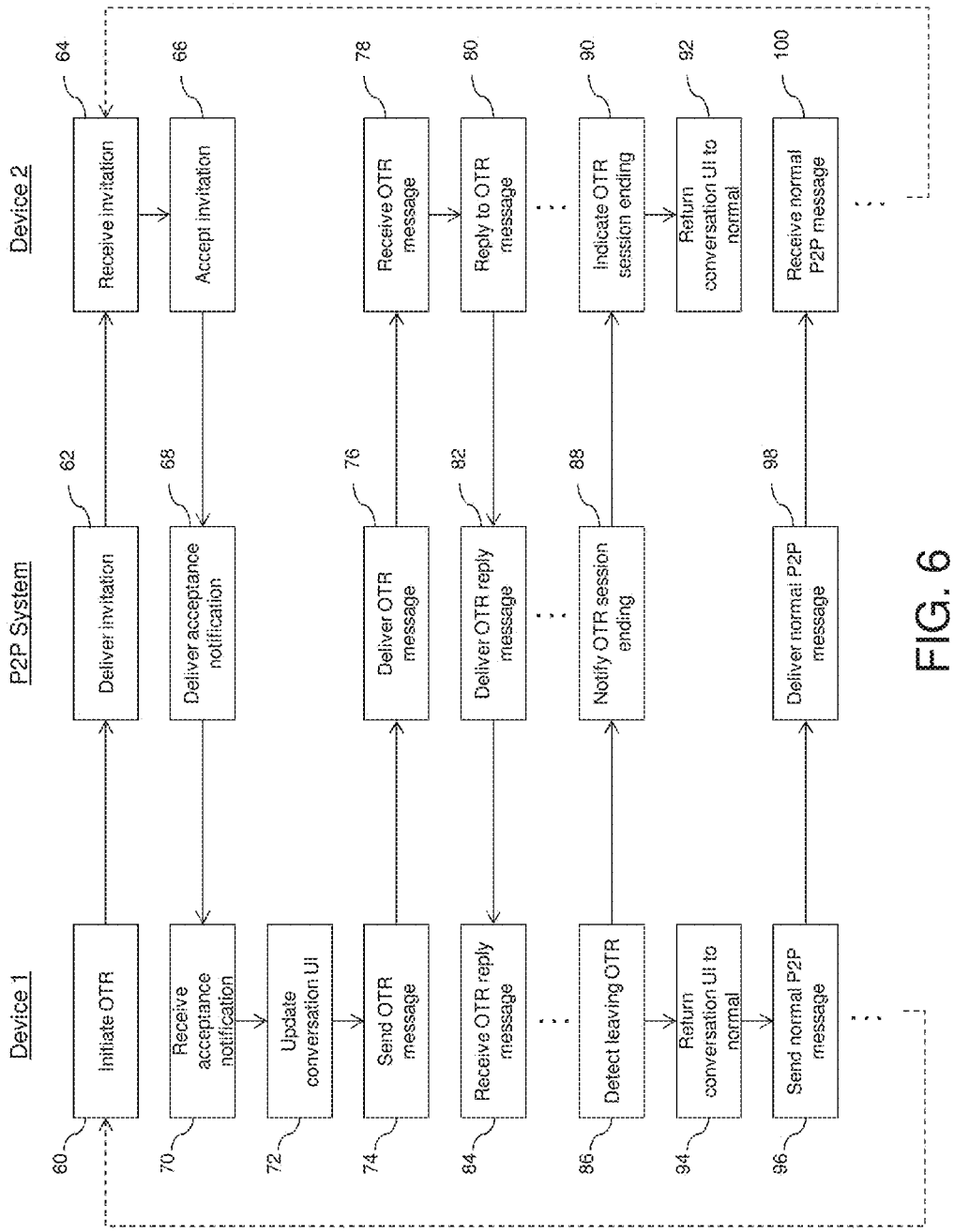
FIG. 6 is a flow chart illustrating computer executable operations that may be performed in conducting a private messaging session within a peer-to-peer messaging conversation.

FIG. 6 illustrates operations that may be performed for navigating into and out of a private OTR sub-chat with a particular contact, using an IM conversation UI 18 for that contact. In the example shown in FIG. 6 it is assumed that the same device initiates and leaves the OTR mode, however, it will be appreciated that one device may initiate the OTR mode and another leave the OTR mode thus ending the OTR sub-session, as will be explained in greater detail below. At 60 a user of the first mobile device 10a initiates use of the OTR mode with a user of the second mobile device 10b, e.g., by selecting an option from within an IM conversation UI 18 with the associated contact to create an "invitation" to participate in the private sub-session. The P2P system 22 delivers an invitation to the second mobile device 10b at 62, which is received by the second mobile device 10b at 64. It can be appreciated that the participation by the P2P system 22 is shown for illustrative purposes and other exchange mechanisms, including direct communications between mobile device 10a and mobile device 10b are equally applicable within the principles discussed herein.

The second mobile device 10b therefore is provided with an opportunity to accept or decline the invitation, which enables both users to decide whether or not they wish to engage in a private discussion. It can be appreciated that while the invitation is pending (i.e. until the invitation has been accepted or declined), regular P2P messages 14 may be permitted. For example, after receiving the invitation, the second mobile device 10b may wish to send a regular P2P message 14 to explain why they are about to decline an invitation to participate in the OTR mode. The second mobile device 10b in this example accepts the invitation at 66 triggering an acceptance notification or other message or indicator, and the P2P system 22 facilitates delivery of an acceptance notification at 68, which is received by the first mobile device 10a at 70. As discussed above, the OTR mode is advantageously provided within the same IM conversation UI 18 as the regular P2P messaging. At 72, the first mobile device 10a updates, modifies or otherwise changes the IM conversation UI 18 to provide an indication that the OTR mode is active. As discussed in greater detail below, these changes to the IM conversation UI 18 may include concealing the identity of the contact with which the user is communicating in the OTR mode, e.g., by concealing names, avatars, and other identity-revealing information from being displayed.

Once in the OTR mode, a private OTR message 16 is sent by the first mobile device 10a at 74. The private OTR message 16 in this example is similarly configured as the regular P2P messages 14, but identifies as an OTR message 16, e.g. by changing a message type or utilizing a particular type of message ID. By identifying the message as an OTR message 16, during the OTR mode, the messages being exchanged may be stored in the temporary storage 56 rather than being persisted with the regular P2P messages 14 associated with the IM conversation data 54 for that IM conversation. Similarly, when the P2P system 22 facilitates delivery of the OTR message 16 at 76, the P2P system 22 is able to identify that the OTR message 16 should be handled in a different manner, e.g., to store only temporarily or not at all. The OTR message 16 is received by the second mobile device 10b at 78, and in this example, an OTR reply message 16 is generated and sent at 80. The OTR reply message 16 in this example is made while both the first and second mobile devices 10a, 10b stay within the OTR mode. As discussed in greater detail below, to maintain secrecy, the IM application 50 can be configured to automatically end an OTR sub-session and revert to regular messaging upon detecting various events, such as navigating away from the IM conversation UI 18, de-selection of an OTR option, etc. In the example shown in FIG. 6, the OTR reply message 16 is sent while the OTR mode is active, and the P2P system 22 is able to facilitate delivery of the OTR reply message 16 at 82, and the first mobile device 10a receives the OTR reply message 16 at 84. As illustrated by the dotted lines in FIG. 6, OTR messaging may continue until one of the users leaves the OTR mode or another predetermined event is detected by the mobile device 10, such as a timeout (e.g., inactivity in the UI for a predetermined amount of time), device shutdown, etc.

The first mobile device 10a detects leaving the OTR mode at 86, which triggers an OTR session ending notification, delivery of which is facilitated by the P2P system 22 at 88 and is received by the second mobile device 10b and indicated to the associated user at 90, e.g., by displaying a message in the IM conversation UI 18. By exiting or leaving the OTR mode, the respective IM applications 50 on the first and second mobile devices 10*a*, 10*b* return the IM conversation UIs 18 to their normal or regular state, e.g., by revealing the regular message history, names, avatars, and other identifying information. The sending, delivery of, and receipt of normal P2P messages 14 may then resume at 96, 98, and 100 respectively. As shown by the dashed lines in FIG. 6, subsequent OTR sub-chats may be initiated by subsequent use of the OTR mode. As discussed above, either of the users may initiate OTR sub-chats and the example shown in FIG. 6 is only one illustrative scenario.

Figure 7:
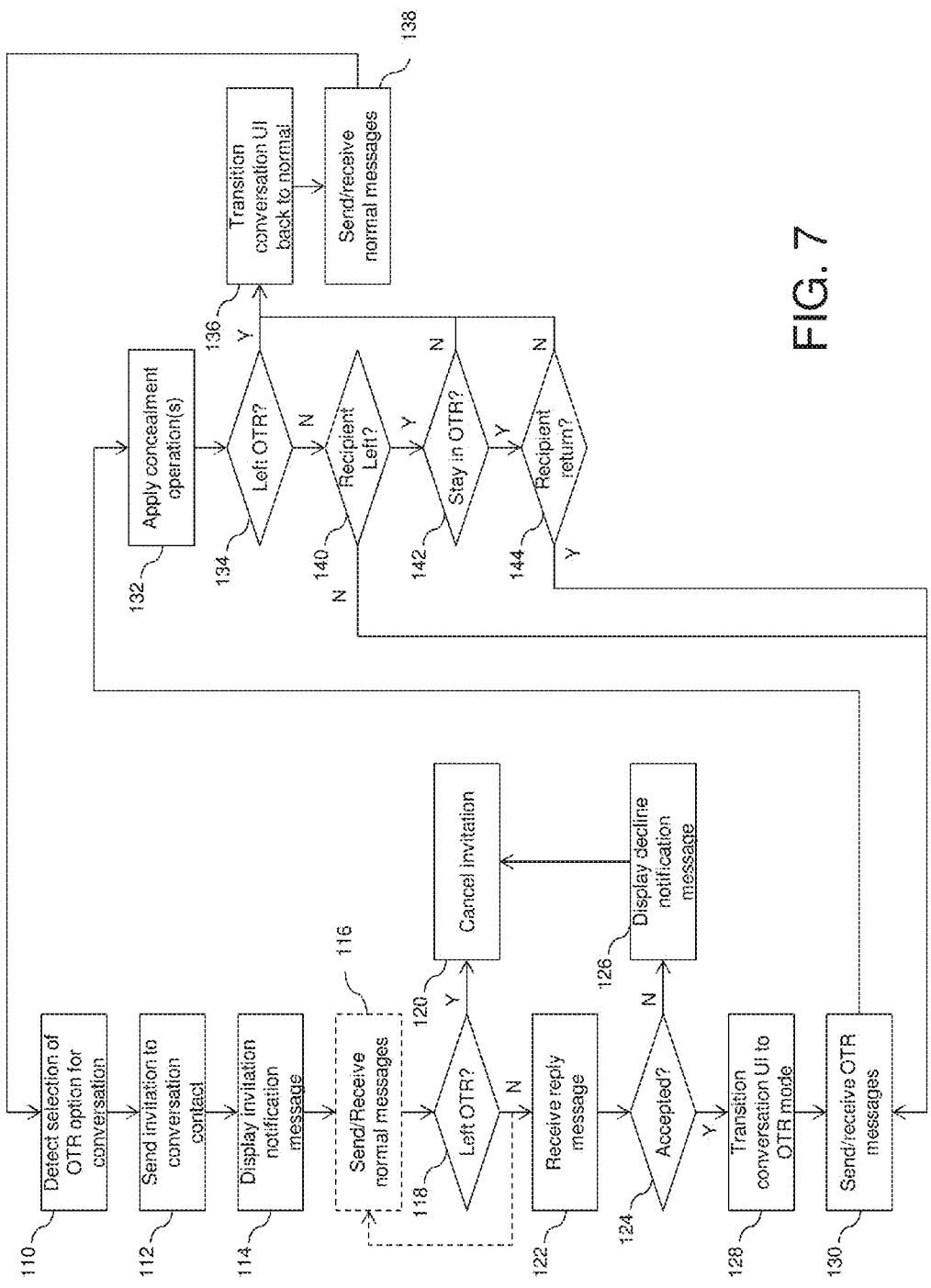
FIG. 7 is a flow chart illustrating computer executable operations that may be performed by an initiating device in conducting a private messaging session within a peer-to-peer messaging conversation.

Entering into and navigating out of the OTR mode may be controlled by the IM application 50 and OTR module 52 in order to ensure acceptance by both parties and to allow regular messaging until invitations to enter the OTR mode are accepted. FIG. 7 illustrates example operations performed by a requestor to enter the OTR mode, e.g., the first mobile device 10*a* in the scenario shown in FIG. 6. At 110 selection of an OTR option for an IM conversation 54 is detected, and an invitation is sent to the contact associated with the IM conversation 54 at 112. The requestor mobile device 10 displays an invitation notification message at 114 to identify that an OTR mode request/invitation has been made, e.g. by placing such a notification in a regular P2P message 14 to be displayed within the regular conversation activity. It can be appreciated that such notifications may be optional and/or may expire after a predetermined amount of time (e.g., after the OTR session ends or is declined) in order to maintain secrecy even of the attempt to have the private sub-chat. Such options may be presented as user preferences or selectable options. As illustrated with dashed lines, normal P2P messages 14 may be sent and received at 116 while the requestor mobile device 10 awaits a reply to the invitation to enter the OTR mode. At 118 it is determined whether or not the OTR attempt/session has been exited, e.g., if the user navigates away from the IM conversation 54 in which the invitation has been set. If the user has left the OTR attempt, the invitation is canceled at 120. If not, normal messaging may continue at 116 until a reply message is received at 122.

The reply message may include an indication that the invitation has been accepted or declined and the IM application 50 or OTR module 52 determines this at 124. If the invitation has been declined, a decline notification message is displayed at 126 and the invitation canceled at 120. It can be appreciated that normal IM messaging may continue using the same IM conversation UI 18 when an invitation is declined and therefore subsequent requests may be detected by returning to 110 as illustrated in dashed lines. When the invitation has been accepted, the IM conversation UI 18 is transitioned to the OTR mode at 128, which may include concealing visual elements related to the identity of the contact. OTR messages 16 may then be sent and received at 130, e.g., as shown in FIG. 6. As discussed by way of example below, one or more concealment operations may be applied at 132 to the OTR messages 16 that are temporarily displayed in the modified IM conversation UI 18 to add further secrecy to the private conversation. For example, only the most recent OTR message 16 may be displayed in the clear, with the content of older OTR messages 16 disappearing after a period of time, being faded as they become older, or otherwise concealed or removed from the display according to predetermined criteria. A mechanism to selectively reveal the content for such concealed OTR messages 16 can also be provided.

The IM application 50 or OTR module 52 determines at 134 whether or not the user has opted to leave the OTR mode, e.g., by actively cancelling or ending the OTR mode or navigating away from the IM conversation UI 18. If the user has left the OTR mode, the IM conversation UI 18 is transitioned back to its normal state at 136, e.g., by revealing the regular P2P messages 14 and removing the OTR messages 16. Regular P2P messages 14 may then be sent and received at 138 and the process may repeat if further selections of the OTR option are detected. For example, a user may have several smaller private sub-conversations spaced apart in time from each other by navigating into and out of the OTR mode within the IM conversation UI 8 for the contact with which they wish to have the private sub-chat.

The IM application 50 or OTR module 52 also determines at 140 whether or not the recipient has left the OTR mode. For example, if the recipient leaves the OTR mode, a notification message would be received by the requestor. If the recipient has not left, OTR messages 16 may continue to be sent and received at 130. If the recipient has left, it is determined at 142 whether or not the requestor stays in the OTR mode. This may occur if the recipient leaves the OTR mode for a brief period of time and then re-enters OTR mode. In such a scenario, the requestor may stay in the OTR mode during the brief absence while the IM conversation UI 18 for the recipient transitions out of OTR mode and into normal IM messaging and back again. If the requestor stays in the OTR mode, the IM application 50 or OTR module 52 determines at 144 whether or not the recipient has returned or otherwise re-entered the OTR mode. If so, the requestor may continue to send and receive OTR messages 16 without having to perform the invitation operations described above. If, however, the requestor leaves OTR mode or the recipient does not return to the OTR mode (e.g., after a particular amount of time), the IM conversation UI 18 transitions back to normal messaging as described above at 136.

Figure 8:
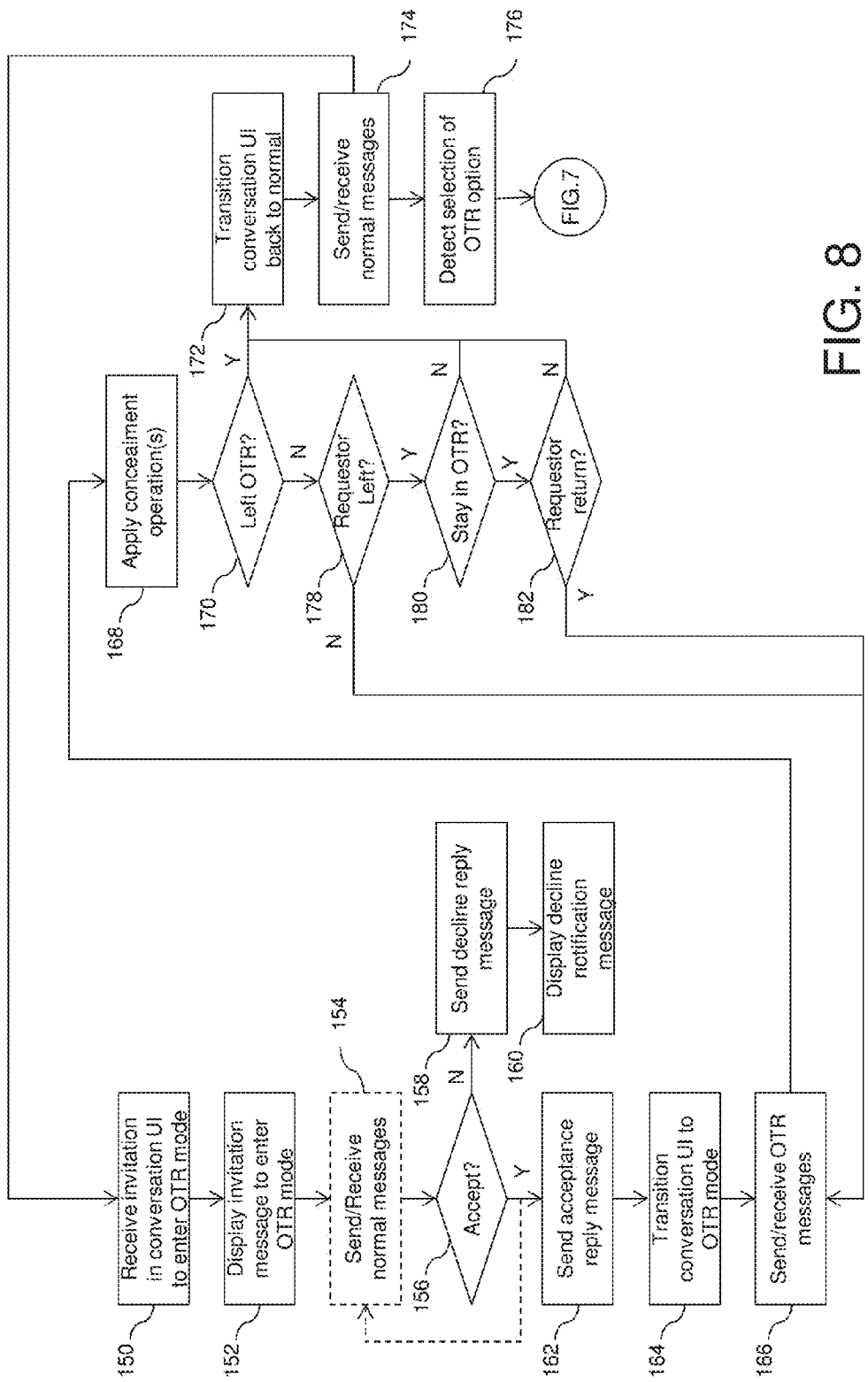
FIG. 8 is a flow chart illustrating computer executable operations that may be performed by an initiating device in conducting a private messaging session within a peer-to-peer messaging conversation.

FIG. 8 illustrates operations that are performed by the recipient of a request to enter the OTR mode. At 150 an invitation to enter the OTR mode is received by the recipient from within an IM conversation UI 18 associated with the requestor. An invitation message displayed at 152 to enable the recipient to accept or decline the invitation and regular P2P messages 14 may be sent and received at 154 (illustrated in dashed lines) until an action is taken with respect to the invitation. The IM application 50 or OTR module 52 determines at 156 whether or not the invitation has been accepted by the user associated with the recipient mobile device 10. If the invitation is not accepted, decline reply message is sent to the requestor mobile device 10 at 158 and a decline notification message may be displayed on the recipient mobile device 10 at 160. As illustrated in dashed lines in FIG. 8, despite declining the invitation, subsequent invitations may be received and the process repeated at a later time.

If the user accepts the invitation at 156, an acceptance reply message is sent to the requestor mobile device 10 at 162 and the IM conversation UI 18 is transitioned to the OTR mode at 164, similar to what is described above. OTR messages 16 may then be sent and received at 166 and the aforementioned concealment operations may be applied at 168 as discussed above.

The IM application 50 or OTR module 52 determines at 168 whether or not the user has opted to leave the OTR mode, e.g., by actively cancelling or ending the OTR mode or navigating away from the IM conversation UI 18. If the user has left the OTR mode, the IM conversation UI 18 is transitioned back to its normal state at 172, e.g., by revealing the regular P2P messages 14 and removing the OTR messages 16. Regular P2P messages 14 may then be sent and received at 174 and the process may repeat if further invitations are received. Also, as shown in FIG. 8, the recipient mobile device 10 may also detect selection of the OTR option at 176, e.g., to subsequently re-enter the OTR mode with the same contact (formerly the requestor), at which point the operations shown in FIG. 7 may be performed.

The IM application 50 or OTR module 52 also determines at 178 whether or not the requestor has left the OTR mode. For example, if the requestor leaves the OTR mode, a notification message would be received by the recipient. If the requestor has not left, OTR messages 16 may continue to be sent and received at 166. If the requestor has left, it is determined at 180 whether or not the recipient stays in the OTR mode. This may occur if the requestor leaves the OTR mode for a brief period of time and then re-enters OTR mode. In such a scenario, the recipient may stay in the OTR mode during the brief absence while the IM conversation UI 18 for the requestor transitions out of OTR mode and into normal IM messaging and back again. If the recipient stays in the OTR mode, the IM application 50 or OTR module 52 determines at 182 whether or not the requestor has returned or otherwise re-entered the OTR mode. If so, the recipient may continue to send and receive OTR messages 16 without having to perform the invitation operations described above. If, however, the recipient leaves OTR mode or the requestor does not return to the OTR mode (e.g., after a particular amount of time), the IM conversation UI 18 transitions back to normal messaging as described above at 172.

FIG. 9 illustrates operations that may be performed by the IM application 50 or OTR module 52 in handling messages upon a transition from regular IM messaging to OTR messaging. At 186 the IM application 50 or OTR module 52 detects entry into the OTR mode and changes a message type for sent or received messages from the associated contact at 188, during the OTR mode. In the example described herein, OTR messages 16 are therefore used during the OTR mode and are stored in the temporary storage 56 at 190. The IM application 50 or OTR module 52 determines at 192 whether or not the user has left the OTR mode. If not, the message type continues to be changes and OTR messages 16 stored at 188 and 190. Once the user has left the OTR mode, normal messaging resumes at 194, in which normal P2P messages 14 are used and stored as the IM application 50 normally would.

In addition to displaying P2P messages 14, 16 in the IM conversation UI 18, notifications may also be displayed by the mobile device 10, e.g., to indicate that a message 14, 16 has been received, including messages 14 inviting a user to chat in the OTR mode. FIG. 10 illustrates operations that may be performed by the IM application 50 or other application or service on the mobile device 10 for handling notifications during use of the OTR mode. At 196 receipt of an OTR message 16 is detected and information in a corresponding message notification is concealed at 198. For example, as described below, the sender and/or content that would normally be displayed in the notification, as well as other message preview content, can be removed to maintain secrecy of the private messaging. In other words, regular notifications can be modified to inform the use of the new "invitation" to chat privately, without explicitly revealing its context or underlying sensitive information. A modified message notification is then displayed at 200.

Turning now to FIGS. 11 to 39, various screen shots are provided to illustrate navigation into and out of the OTR mode from the perspective of the requestor and the recipient of an invitation to participate in a private OTR sub-chat.

Figures 13, 14:
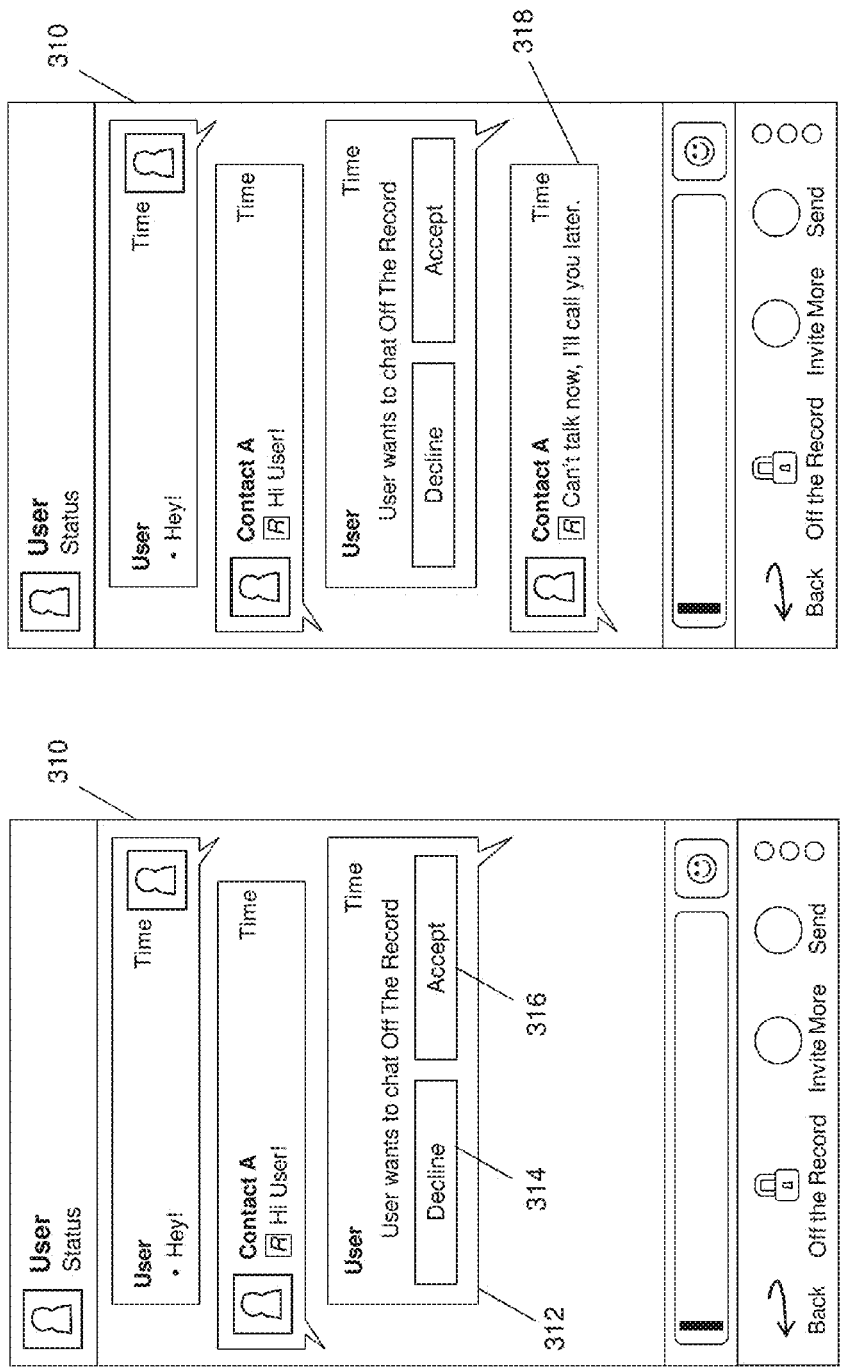
FIG. 13 is a screen shot of an example of a graphical user interface for an instant messaging conversation displaying a notification that a private messaging invitation has been received.
FIG. 14 is a screen shot of an example of a graphical user interface for an instant messaging conversation displaying a normal instant message without a private messaging invitation being accepted.

In FIG. 11, an IM conversation UI 300 is shown which includes an OTR option 302, which enables a user to enter an OTR mode with the associated contact for that conversation, in this example, Contact A. By selecting the OTR option 302 as shown in FIG. 11, an invitation notification message 304 is displayed in the IM conversation UI 300 for the requestor as shown in FIG. 12. The notification message 304 includes a Cancel option 306 to enable the requestor to cancel the invitation request while the invitation is pending. The recipient of the invitation is the associated contact for the IM conversation UI 300. An IM conversation UI 310 for the recipient (i.e. Contact A in this example) is shown in FIG. 13. The recipient IM conversation UI 310 displays an invitation message 312 that includes a decline option 314 to enable the recipient to decline the invitation, and an accept option 316 to enable the recipient to accept the invitation and enter a private OTR sub-chat. While the invitation is pending, normal P2P messages 14 can be sent or received, e.g., as shown in FIG. 14 in which the recipient sends a message 318 to User indicating that they are unable to enter the OTR mode at that time.

Figure 16:
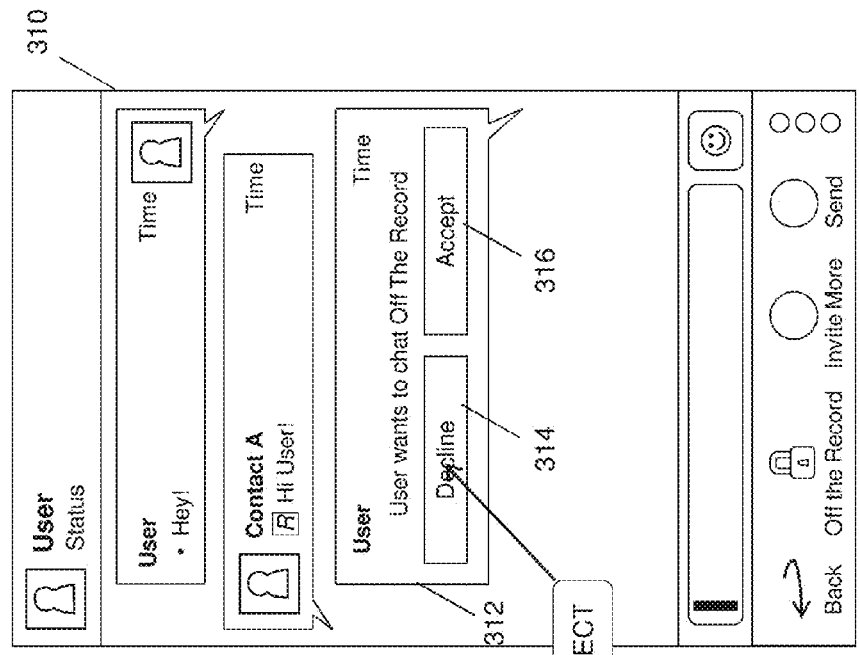
FIG. 16 is a screen shot of an example of a graphical user interface for an instant messaging conversation illustrating cancelation of a private messaging invitation by the recipient.
Figure 15:
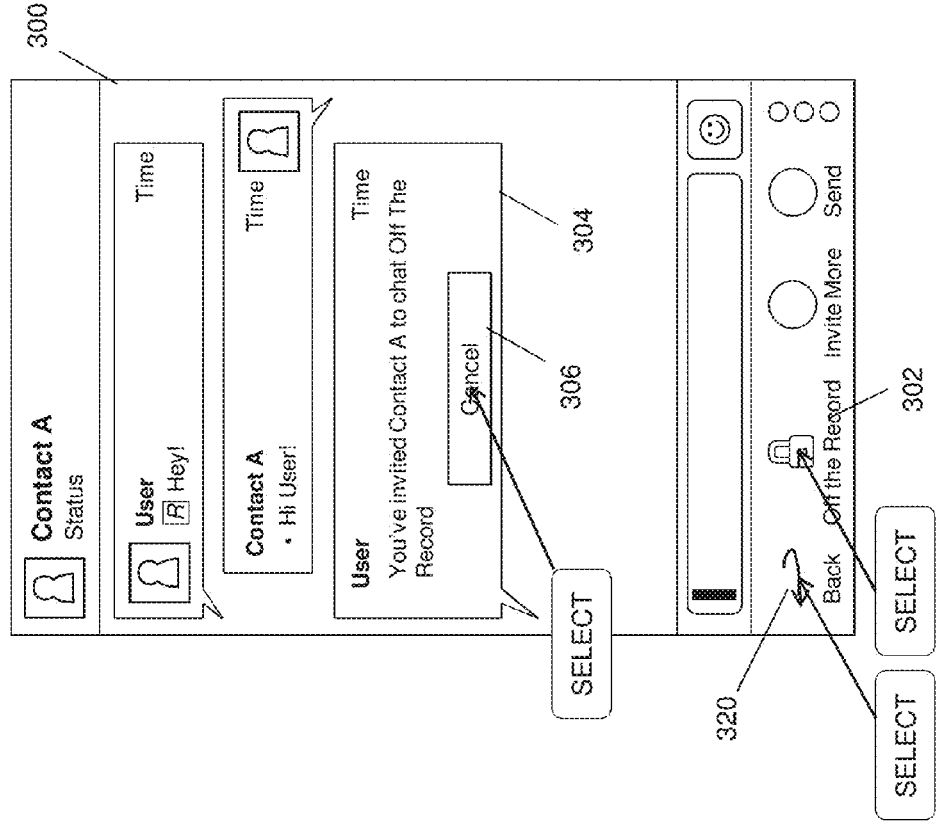
FIG. 15 is a screen shot of an example of a graphical user interface for an instant messaging conversation illustrating cancelation of a private messaging invitation by the requestor.

To avoid the recipient of the invitation accepting the invitation only to find that the requestor has left the chat, the requestor may be committed to staying within the IM conversation UI 300 until the recipient responds. For example, as shown in FIG. 15, upon selecting the Cancel option 306, or navigating away from the IM conversation UI 300 by selecting a Back option 320 or re-selecting (or de-deselecting) the OTR option 302. As shown in FIG. 16, the recipient may also decline the invitation by selecting the decline option 314. FIGS. 17 and 18 illustrate invitation request decline messages 322 and 324 that are displayed to the requestor and the recipient respectively after the invitation is canceled or declined. As shown in FIGS. 17 and 18, the decline messages 322, 324 may be generated by replacing the Cancel option 306, decline option 314, and accept option 316 with notifications, in this example "REQUEST DECLINED".

As shown in FIGS. 19 and 20, if the recipient accepts the invitation request, entry mechanisms 330, 332 may be displayed on the requestor IM conversation UI 300 and recipient IM conversation UI 310 respectively to enable the users to enter the OTR mode. In the example shown in FIGS. 19 and 20, a set of arrows is displayed which may be swiped upwardly to transition the IM conversation UI 300, 310 into an OTR screen 340 as shown in FIG. 21. As can be seen in FIG. 21, the OTR screen 340 is a modified version of an IM conversation screen 300, 310 wherein identifying information is removed (e.g., header with name, avatar, etc.), the message area 342 is cleared, an explanation message 344 is displayed, and wherein a messaging option portion 346 remains the same. The OTR screen 340 may also be configured as an overlay that is displayed on top of the IM conversation UI 300, 310 to obscure viewing of the IM conversation UI 300, 310 while the OTR mode is being used. Although not shown in FIG. 21, the OTR screen 340 may also be overlaid such that a small portion of the IM conversation UI 300, 310 (e.g., an outermost border) is visible such that the UI appears as a private conversation within a regular conversation with one or more contacts. As such, messages can be composed and sent to the other correspondent as if a normal IM conversation was taking place, thus providing the familiarity of the normal messaging environment while providing additional security and privacy. Also, as shown in FIG. 21, the regular conversation messages have been removed with only the OTR portion of the conversation (i.e. the OTR sub-chat) being displayed.

FIG. 22 illustrates an OTR screen 340 in which various OTR messages 348 are displayed. A concealment mechanism 350 such as blurring or fading (or removal) is applied to the avatar normally displayed with the message to identify the other correspondent. Similarly, the name of the other correspondent can be removed. The IM application 50 or OTR module 52 can also be configured to enable or disable various features normally provided within an IM conversation. For example, as shown in FIG. 22, photo messages may be supported along with the ability to send text, voice notes, and video. As discussed above, while messages may be sent, received, and accumulate within the OTR screen 340, by navigating away from the OTR screen 340, the private OTR messages 348 are deleted and irretrievable to maintain the secrecy of the private sub-chat.

The number of messages 348 displayed in an OTR screen 340 may be limited such that after a predetermined number of messages 348 accumulate, the oldest one(s) is/are deleted. Also, as shown in FIG. 23, messages 348 may begin to fade or become obscured as they move towards the top of the visible portion of the OTR conversation leaving an obscured message 354 on the display. It can be appreciated that while fading is applied to only the topmost message in FIG. 23, a gradient of fading could also be applied to all messages except the most recent, and/or fading can gradually become more obscure as time elapses. To avoid the contents of the private sub-chat being copied to device memory, the ability to take screen shots can be disabled during OTR mode. As shown in FIG. 24, a system notification 356 may be displayed upon detecting an attempt to take a screen shot. The OTR mode may also prohibit certain message types and/or attachment types (e.g., documents, etc.). If a user attempts to send such an unsupported message or attachment type, a dialogue 360 may be displayed as shown in FIG. 25 prompting the user to leave OTR mode in order to send such a message or attachment type.

Figures 25, 26:
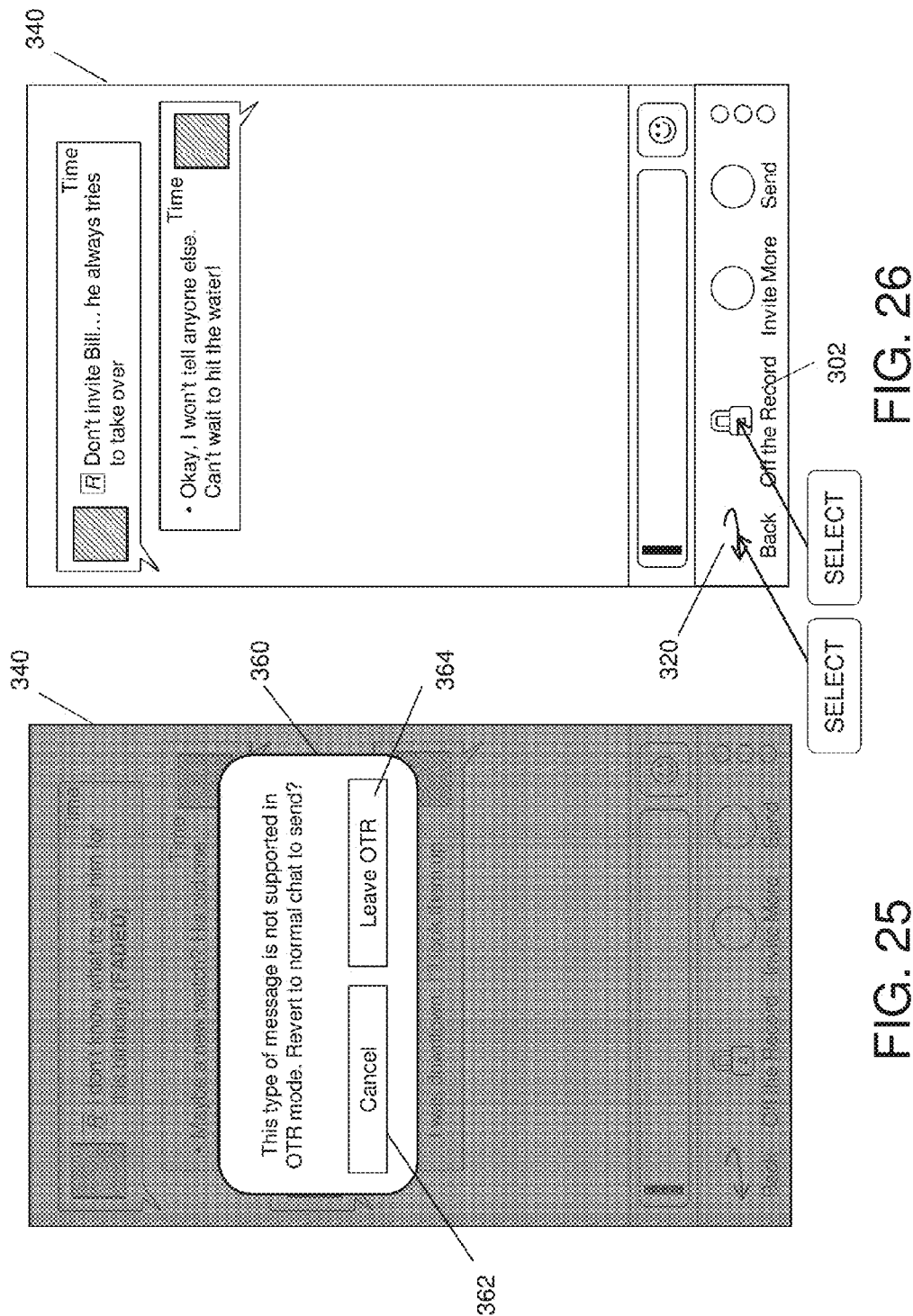
FIG. 25 is a screen shot illustrating a notification for an unsupported message type displayed during a private messaging session.
FIG. 26 is a screen shot of an example of a private messaging user interface illustrating navigation out of the private messaging session.
Figures 27, 28:
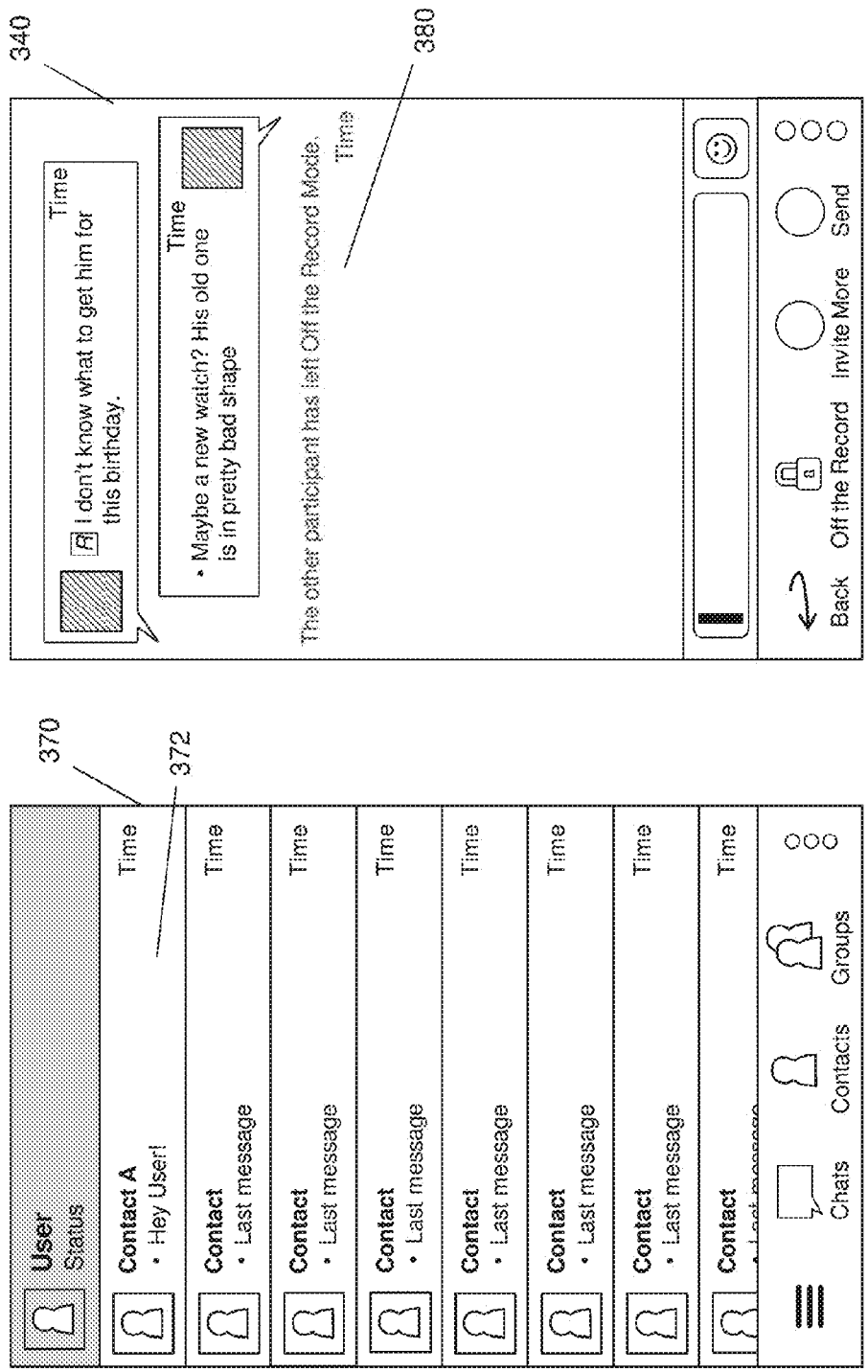
FIG. 27 is a screen shot of an instant messaging conversation list user interface.
FIG. 28 is a is a screen shot of an example of a private messaging user interface displaying a notification that the other participant has left the private messaging session.

Turning now to FIG. 26, as discussed above, navigating away from the OTR screen 340 triggers leaving the OTR mode, e.g., by selecting the back option 320 or the OTR option 302 as shown in FIG. 26. By selecting the back option 320, the user is navigated back to a conversation list UI 370 as shown in FIG. 27. To re-enter the normal IM conversation UI 300, the user selects the Contact A entry 372 in the conversation list, bringing the user back to the IM conversation UI 300 shown in FIG. 11. By selecting the OTR option 302, the user is directed directly back into the IM conversation UI 300 shown in FIG. 11.

When a user leaves the OTR mode, the other correspondent can be notified of the departure, e.g., as shown in FIG. 28 in which a system notification message 380 is displayed indicating that the other participant has left OTR mode and the corresponding time. In one example, the OTR screen 340 as shown in FIG. 28 can be configured to automatically transition back to the regular IM conversation UI 300 as shown in FIG. 29, after a timeout period elapses. Alternatively, the OTR screen 340 can remain displayed for the user that did not leave the OTR mode until that user navigates away from the OTR screen 340. In this way, the other correspondent may be given the ability to leave and return to OTR mode without forcing the remaining correspondent to redo the invitation opt-in process discussed above.

FIG. 30 illustrates an OTR screen in which a first system message 380 indicates that the other participant has left OTR mode, but since the user stays in the OTR screen 340, upon the other participant re-entering OTR mode, a second system message 400 is displayed rather than a second invitation. Subsequent OTR messages 450 may then be sent and received to carry on the private sub-chat. It can be appreciated that since the OTR-based conversation would be deleted by the IM application 50 or OTR module 52 for the participant that left the OTR mode, the OTR message history can be made irretrievable for re-entering participants to avoid unnecessary sharing of the sensitive content. It can be appreciated however, that it at least some examples, a participant that does not leave OTR mode can be relied upon to re-send the OTR message history. The remaining participant may also be forced to leave the OTR mode after a predetermined amount of time, e.g., 60 seconds. Within that time frame, the user who has left can re-enter OTR mode and continue the conversation without going through the invitation flow again, but may not have the message history due to the navigation out of and then back into the OTR mode. Such re-entry navigations accommodate temporary multi-tasking, e.g., to answer an incoming phone call, without requiring a complete re-application of the invitation flow.

As discussed above in connection with FIG. 10, a notification 520 associated with a private OTR message 16 may be modified to remove at least the content that would normally be displayed, e.g., in a home screen 500 as shown in FIG. 31. In this way, the notification can continue to have the desired impact of indicating that a new message (e.g., invitation to enter the OTR mode) has been received, but without revealing the contents of the message outside of the OTR environment.

Figure 34:
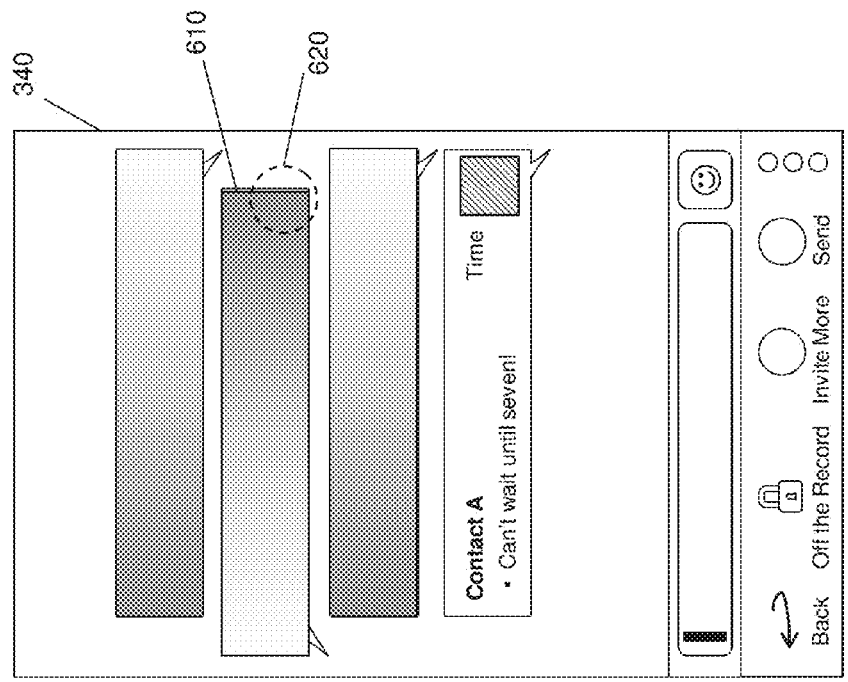
Figure 33:
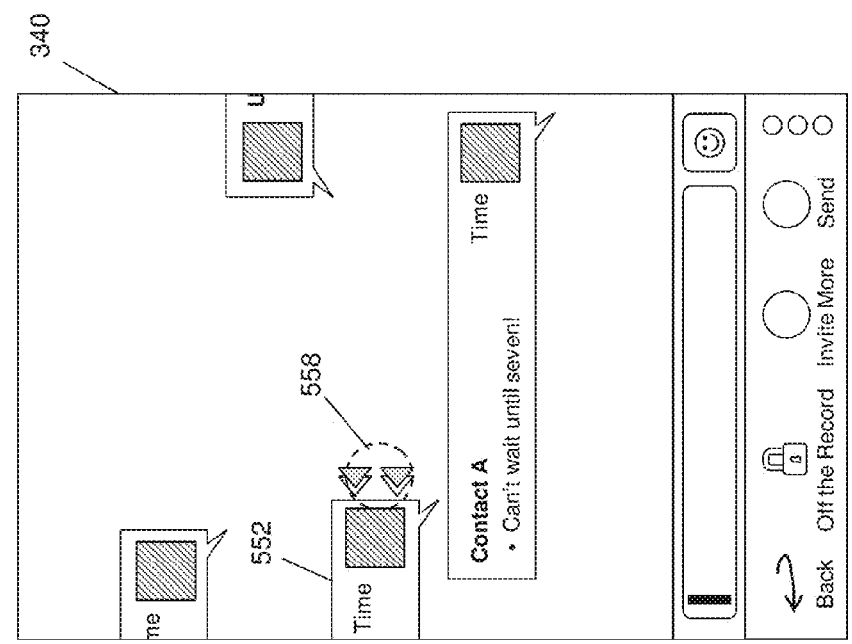

FIGS. 32 to 39 illustrate various additional ways of concealing OTR messages 16 in the form displayed within the OTR screen 340. FIG. 32 illustrates hidden messages 550 that can be dragged or "pulled" outwardly to reveal the contents of the message. In FIG. 32, the second-to-most recent message 552 is dragged outwardly using a left-to-right swipe gesture 554. As shown in FIG. 33 the same message 552 can be pushed back to a hidden position using a right-to-left swipe gesture 558. FIG. 34 illustrates that faded messages 610 can be revealed by applying an input to a desired one of the faded messages 610, in this example a tap-and-hold input 620. After tapping and holding for a predetermined amount of time, the previously faded message becomes a revealed message 630 as shown in FIG. 35. The revealed message 630 returns to being a faded message 610 after a predetermined amount of time, or by re-applying the tap-and-hold gesture, to return to the OTR screen 340 shown in FIG. 36. As noted above, messages in the conversation UI 340 can be configured to disappear after a period of time such that any given message is only displayed for a relatively short period of time. The expiration of such messages can also be combined with fading during the period of time during which the message is displayed.

In yet another example shown in FIGS. 37-39, the contents of the message can also be encoded to create scrambled content 710 within a concealed message 700. The concealed message can also include a "read" bar 720 that can be pulled or swiped 730 across the scrambled content 710 to generate decoded content 740 as shown in FIG. 38. Upon reaching the other end of the message 700, the complete content is revealed, e.g., for a predetermined amount of time, until detecting a reverse gesture applied to the read bar 720, etc.

For messages containing other types of media, such as voice or video messages, concealment methods can also be applied, e.g., by performing masking to any identifying features. For example, a voice message can be modified to conceal or mask the pitch and timber of the voice to obscure the identity of the creator of the voice message. Similarly, for video messages, the face and/or other identifying features of the participant shown in the video can be obscured by blurring, fading, etc. Additionally, techniques to mask the accompanying voice can also be applied.

It can therefore be seen that various mechanisms may be applied to the OTR messages 16 as displayed in order to enhance the privacy of the OTR sub-chat to not only prevent persisting such messages, but also limiting the exposure of the contents of the displayed messages.

Figure 40:
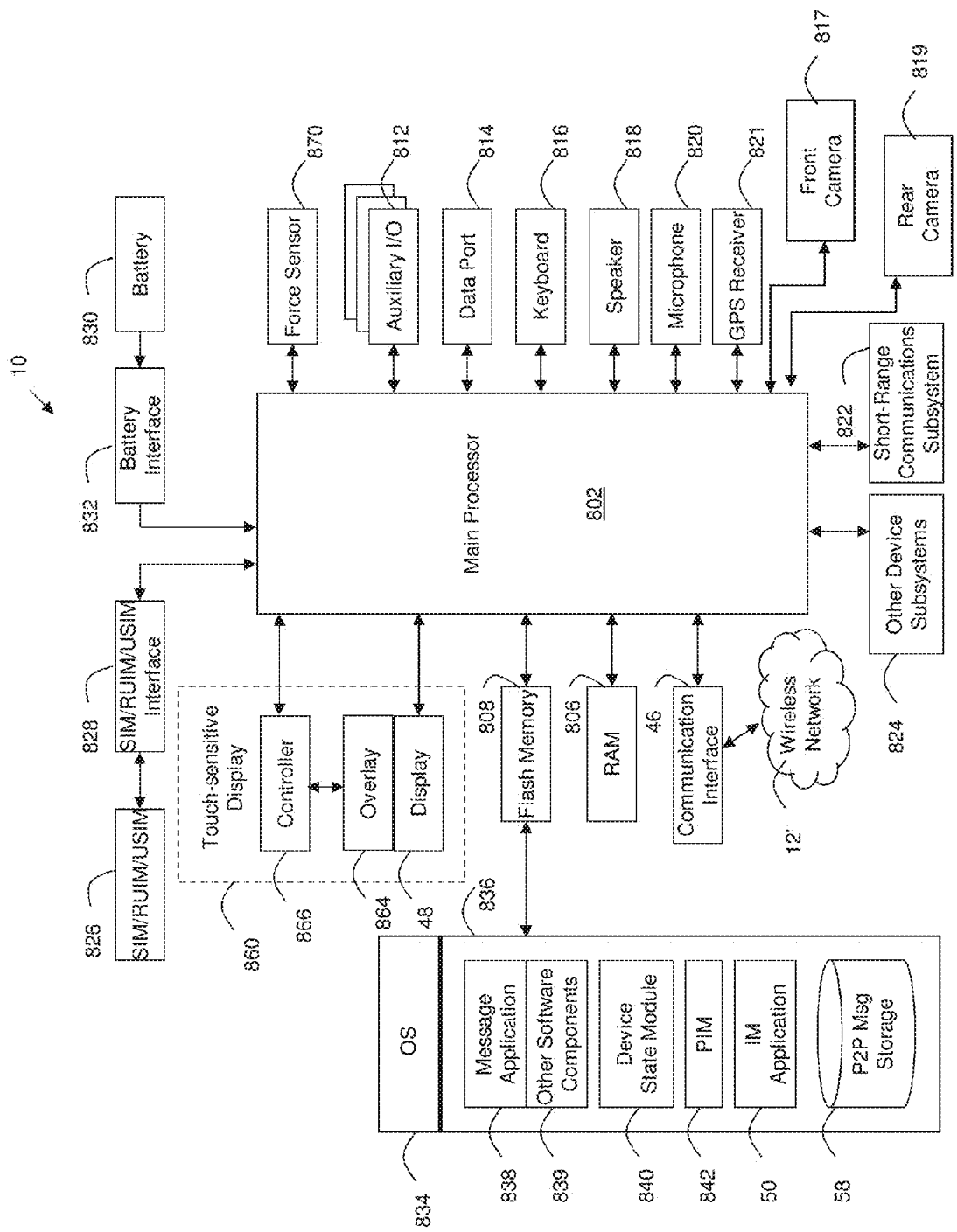
FIG. 40 is a block diagram of an example of a configuration for a mobile electronic communication device.

Referring to FIG. 40, to further aid in the understanding of the example mobile devices 10 described above, shown therein is a block diagram of an example configuration of a device configured as a "mobile device", referred to generally as "mobile device 10". The mobile device 10 includes a number of components such as a main processor 802 that controls the overall operation of the mobile device 10. Communication functions, including data and voice communications, are performed through at least one communication interface 46. The communication interface 46 receives messages from and sends messages to a wireless network 12'. In this example of the mobile device 10, the communication interface 46 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 46 with the wireless network 12' represents one or more different Radio Frequency (RF) channels, operating according to defined protocols specified for GSM/GPRS communications.

The main processor 802 also interacts with additional subsystems such as a Random Access Memory (RAM) 806, a flash memory 808, a touch-sensitive display 860, an auxiliary input/output (I/O) subsystem 812, a data port 814, a keyboard 816 (physical, virtual, or both), a speaker 818, a microphone 820, a GPS receiver 821, a front camera 817, a rear camera 819, short-range communications subsystem 822, and other device subsystems 824. Some of the subsystems of the mobile device 10 perform communication-related functions, whereas other subsystems may provide "resident" or on-device functions. By way of example, the touch-sensitive display 860 and the keyboard 816 may be used for both communication-related functions, such as entering a text message for transmission over the wireless network 12', and device-resident functions such as a calculator or task list. In one example, the mobile device 10 can include a non-touch-sensitive display in place of, or in addition to the touch-sensitive display 860. For example the touch-sensitive display 860 can be replaced by a display 48 that may not have touch-sensitive capabilities.

The mobile device 10 can send and receive communication signals over the wireless network 12' after required network registration or activation procedures have been completed. Network access is associated with a subscriber or user of the mobile device 10. To identify a subscriber, the mobile device 10 may use a subscriber module component or "smart card" 826, such as a Subscriber Identity Module (SIM), a Removable User Identity Module (RUIM) and a Universal Subscriber Identity Module (USIM). In the example shown, a SIM/RUIM/USIM 826 is to be inserted into a SIM/RUIM/USIM interface 828 in order to communicate with a network.

The mobile device 10 is typically a battery-powered device and includes a battery interface 832 for receiving one or more rechargeable batteries 830. In at least some examples, the battery 830 can be a smart battery with an embedded microprocessor. The battery interface 832 is coupled to a regulator (not shown), which assists the battery 830 in providing power to the mobile device 10. Although current technology makes use of a battery, future technologies such as micro fuel cells may provide the power to the mobile device 10.

The mobile device 10 also includes an operating system 834 and software components 836 to 842, 50 and 58. The operating system 834 and the software components 836 to 842, 50 and 58, that are executed by the main processor 802 are typically stored in a persistent store such as the flash memory 808, which may alternatively be a read-only memory (ROM) or similar storage element (not shown). Those skilled in the art will appreciate that portions of the operating system 834 and the software components 836 to 842, 50 and 58, such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, may be installed on the mobile device 10 during its manufacture. Software applications may include a message application 838, a device state module 840, a Personal Information Manager (PIM) 842, an IM application 50, and an IM message storage 58. A message application 838 can be any suitable software program that allows a user of the mobile device 10 to send and receive electronic messages, wherein messages are typically stored in the flash memory 808 of the mobile device 10. A device state module 840 provides persistence, i.e. the device state module 840 ensures that important device data is stored in persistent memory, such as the flash memory 808, so that the data is not lost when the mobile device 10 is turned off or loses power. A PIM 842 includes functionality for organizing and managing data items of interest to the user, such as, but not limited to, e-mail, contacts, calendar events, and voice mails, and may interact with the wireless network 12'.

Other types of software applications or components 839 can also be installed on the mobile device 10. These software applications 839 can be pre-installed applications (i.e. other than message application 838) or third party applications, which are added after the manufacture of the mobile device 10. Examples of third party applications include games, calculators, utilities, etc.

The additional applications 839 can be loaded onto the mobile device 10 through at least one of the wireless network 16', the auxiliary I/O subsystem 812, the data port 814, the short-range communications subsystem 822, or any other suitable device subsystem 824.

The data port 814 can be any suitable port that enables data communication between the mobile device 10 and another computing device. The data port 814 can be a serial or a parallel port. In some instances, the data port 814 can be a Universal Serial Bus (USB) port that includes data lines for data transfer and a supply line that can provide a charging current to charge the battery 830 of the mobile device 10.

For voice communications, received signals are output to the speaker 818, and signals for transmission are generated by the microphone 820. Although voice or audio signal output is accomplished primarily through the speaker 818, the display 48 can also be used to provide additional information such as the identity of a calling party, duration of a voice call, or other voice call related information.

The touch-sensitive display 860 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 860 is a capacitive touch-sensitive display which includes a capacitive touch-sensitive overlay 864. The overlay 864 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 48 of the touch-sensitive display 860 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 860. The processor 802 may determine attributes of the touch, including a location of a touch. Touch location data may include an area of contact or a single point of contact, such as a point at or near a center of the area of contact, known as the centroid. A signal is provided to the controller 866 in response to detection of a touch. A touch may be detected from any suitable object, such as a finger, thumb, appendage, or other items, for example, a stylus, pen, or other pointer, depending on the nature of the touch-sensitive display 860. The location of the touch moves as the detected object moves during a touch. One or both of the controller 866 and the processor 802 may detect a touch by any suitable contact member on the touch-sensitive display 860. Similarly, multiple simultaneous touches, are detected.

In some examples, an optional force sensor 870 or force sensors is disposed in any suitable location, for example, between the touch-sensitive display 860 and a back of the mobile device 10 to detect a force imparted by a touch on the touch-sensitive display 860. The force sensor 870 may be a force-sensitive resistor, strain gauge, piezoelectric or piezoresistive device, pressure sensor, or other suitable device.

It will be appreciated that any module or component exemplified herein that executes instructions may include or otherwise have access to computer readable media (including non-transitory computer readable media) such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, P2P system 22, or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of messaging comprising:
displaying a first messaging user interface for a first communications mode with at least one contact, the first messaging user interface comprising at least one element displaying a respective identification image identifying messaging participants;
detecting a first input at the first messaging user interface, to enter a private conversation with the at least one contact;
changing, based on detecting the first input, the first communications mode into a second communications mode with the at least one contact; and
displaying, based on detecting the first input, a second messaging user interface, the second messaging user interface modifying the respective identification images displayed by the at least one element to remove identification information for at least one messaging participant in the second messaging user interface,
the second messaging user interface overlaying and obscuring at least a part of the first messaging user interface to send messages in the second communications mode,
messages received during the second communications mode being deleted upon termination of the second communications mode.

2. The method of claim 1, wherein the modifying comprises removing identification information for of all messaging participants.

3. The method of claim 1, further comprising:
storing, in a persistent storage, messages received during the first communication mode in association with the at least one contact;
receiving at least one private message in the second communications mode;
storing the at least one private message into a temporary storage separate from the persistent storage,
detecting an event ending the private conversation; and
displaying the first messaging user interface based on detecting the event; and
removing, based on detecting the event, the at least one private message from the temporary storage while retaining the messages received during the first communications mode after termination of the first communications mode.

4. The method of claim 3, wherein the event ending the private conversation comprises detecting a navigation away from the second messaging user interface.

5. The method of claim 3, further comprising:
storing, in a persistent storage, messages received during the first communication mode in association with the at least one contact;
receiving, without storing in a memory, at least one private message in the second communications mode;
detecting an event ending the private conversation; and
displaying the first messaging user interface based on detecting the event.

6. The method of claim 1, wherein the first input comprises receipt of an invitation from the at least one contact.

7. The method of claim 6, further comprising detecting a second input accepting the invitation prior to displaying the second messaging user interface.

8. The method of claim 1, wherein the first input comprises selection of an option to enter the private conversation with each contact of the at least one contact in the first communications mode, the method further comprising sending an invitation to each of the at least one contact.

9. The method of claim 8, further comprising receiving an indication that the at least one contact has accepted the invitation prior to displaying the second messaging user interface.

10. The method of claim 8, wherein the second messaging user interface is not displayed until after receiving acceptance of the invitation.

11. The method of claim 10, wherein regular messages normally exchanged using the first messaging user interface are permitted while awaiting a response to the invitation, and
messages normally exchanged using the first messaging interface are not exchanged, based on receiving the acceptance of the invitation, until after termination of the second communications mode.

12. The method of claim 1, further comprising:
concealing a display of content that is sent in private messages, the concealing comprising obfuscating a display of the content displayed in the second messaging user interface during a private conversation; and
displaying, based on receiving a user input to the second messaging user interface associated with a selected private message, the content, which is sent in the selected private message, in the second messaging user interface.

13. The method of claim 12, wherein the concealing comprises any one or more of: fading the content, removing the private message after a period of time, encoding the content, and hiding the content.

14. The method of claim 1, wherein the at least one element comprises any one or more of an avatar, a name, and a status message.

15. A non-transitory computer readable storage medium comprising computer executable instructions for messaging, the computer executable instructions comprising instructions for:
displaying a first messaging user interface for a first communications mode with at least one contact, the first messaging user interface comprising at least one element displaying a respective identification image identifying messaging participants;
detecting a first input at the first messaging user interface, to enter a private conversation with the at least one contact;
changing, based on detecting the first input, the first communications mode into a second communications mode with the at least one contact; and
displaying, based on detecting the first input, a second messaging user interface, the second messaging user interface modifying the respective identification images displayed by the at least one element to remove identification information for at least one messaging participant in the second messaging user interface,
the second messaging user interface overlaying and obscuring at least a part of the first messaging user interface to send messages in the second communications mode,
messages received during the second communications mode being deleted upon termination of the second communications mode.

16. The non-transitory computer readable storage medium of claim 15, wherein the modifying comprises removing identification information for of all messaging participants.

17. The non-transitory computer readable storage medium of claim 15, further comprising instructions for:
storing, in a persistent storage, messages received during the first communication mode in association with the at least one contact;
receiving at least one private message in the second communications mode;
storing the at least one private message into a temporary storage separate from the persistent storage,
detecting an event ending the private conversation; and
displaying the first messaging user interface based on detecting the event; and
removing, based on detecting the event, the at least one private message from the temporary storage while retaining the messages received during the first communications mode after termination of the first communications mode.

18. The non-transitory computer readable storage medium of claim 15, further comprising instructions for:
concealing a display of content that is sent in private messages, the concealing comprising obfuscating a display of the content displayed in the second messaging user interface during a private conversation; and
displaying, based on receiving a user input to the second messaging user interface associated with a selected private message, the content, which is sent in the selected private message, in the second messaging user interface.

19. An electronic device comprising a processor, a display, and memory, the memory comprising computer executable instructions for causing the processor to enable messaging on the electronic device, the computer executable instructions comprising instructions for:
displaying a first messaging user interface for a first communications mode with at least one contact, the first messaging user interface comprising at least one element displaying a respective identification image identifying messaging participants;
detecting a first input at the first messaging user interface, to enter a private conversation with the at least one contact;
changing, based on detecting the first input, the first communications mode into a second communications mode with the at least one contact; and
displaying, based on detecting the first input, a second messaging user interface, the second messaging user interface modifying the respective identification images displayed by the at least one element to remove identification information for at least one messaging participant in the second messaging user interface, the second messaging user interface overlaying and obscuring at least a part of the first messaging user interface to send messages in the second communications mode, messages received during the second communications mode being deleted upon termination of the second communications mode.

* * * * *